(12) United States Patent
Parsons et al.

(10) Patent No.: US 7,549,436 B2
(45) Date of Patent: Jun. 23, 2009

(54) SYSTEM AND METHOD FOR CONVERTING MANUALLY OPERATED FLUSH VALVES

(75) Inventors: Natan E. Parsons, Brookline, MA (US); Fatih Guler, Winchester, MA (US); Jean F. Daher, Auburn, MA (US); Kay Herbert, Winthrop, MA (US); Xiaoxiong Mo, Lexington, MA (US); Yue Zhang, Nashua, NH (US); Haiou Wu, West Roxbury, MA (US)

(73) Assignee: Arichell Technologies, W. Newton, MA (US)

( * ) Notice: Subject to any disclaimer, the term of this patent is extended or adjusted under 35 U.S.C. 154(b) by 0 days.

(21) Appl. No.: 11/442,635

(22) Filed: May 25, 2006

(65) Prior Publication Data

US 2007/0034258 A1    Feb. 15, 2007

Related U.S. Application Data

(63) Continuation-in-part of application No. 10/712,413, filed on Nov. 10, 2003, now Pat. No. 7,063,103, which is a continuation-in-part of application No. 09/972,496, filed on Oct. 16, 2001, now Pat. No. 6,860,282, and a continuation-in-part of application No. 09/916,468, filed on Jul. 27, 2001, now Pat. No. 6,643,853.

(60) Provisional application No. 60/684,752, filed on May 26, 2006.

(51) Int. Cl.
*F15B 13/00* (2006.01)

(52) U.S. Cl. ............... 137/15.18; 137/269; 251/129.04; 4/249

(58) Field of Classification Search ................. 137/269, 137/15.18; 251/129.04; 4/249
See application file for complete search history.

(56) References Cited

U.S. PATENT DOCUMENTS

| 2,552,625 | A | 5/1951 | Filliung | 137/624.12 |
|---|---|---|---|---|
| 2,999,191 | A | 9/1961 | Muradian et al. | 4/249 |
| 3,019,453 | A | 2/1962 | Radcliffe | 4/249 |
| 3,034,151 | A | 5/1962 | Filliung | 4/249 |
| 3,056,143 | A | 10/1962 | Foster | 4/DIG. 3 |
| 3,373,449 | A | 3/1968 | Rusnok | 4/305 |
| 3,778,023 | A | 12/1973 | Billeter | 251/30.01 |
| 4,309,781 | A | 1/1982 | Lissau | 4/304 |
| 4,604,735 | A | 8/1986 | Parsons | 367/93 |
| 4,839,039 | A | 6/1989 | Parsons et al. | 210/143 |
| 4,868,931 | A | 9/1989 | Schneeweiss | 4/308 |
| 4,921,211 | A | 5/1990 | Novak et al. | 251/129.04 |
| 5,062,453 | A | 11/1991 | Saadi et al. | 137/624.11 |
| 5,125,621 | A | 6/1992 | Parsons et al. | 251/30.03 |
| 5,169,118 | A | 12/1992 | Whiteside | 251/30.03 |

(Continued)

FOREIGN PATENT DOCUMENTS

GB        2050576        1/1981

(Continued)

*Primary Examiner*—Kevin L Lee
(74) *Attorney, Agent, or Firm*—Ivan David Zitkovsky

(57) ABSTRACT

Disclosed is a method and system for converting or retrofitting manually-operated flush valves. A conversion system for converting an installed manually-operated flush valve includes a power module, a control module, and a driver module mechanically coupled to a manual handle to externally activate the converted flush valve.

60 Claims, 22 Drawing Sheets

U.S. PATENT DOCUMENTS

| | | | |
|---|---|---|---|
| 5,195,720 A | 3/1993 | Nortier et al. | 251/129.04 |
| 5,224,685 A | 7/1993 | Chiang et al. | 251/129.04 |
| 5,244,179 A | 9/1993 | Wilson | 251/30.03 |
| 5,251,188 A | 10/1993 | Parsons et al. | 367/140 |
| 5,295,655 A | 3/1994 | Wilson et al. | 251/40 |
| 5,313,673 A | 5/1994 | Saadi et al. | 4/313 |
| 5,431,181 A | 7/1995 | Saadi et al. | 137/240 |
| 5,456,279 A | 10/1995 | Parsons et al. | 137/245 |
| 5,680,879 A | 10/1997 | Sheih et al. | 4/DIG. 3 |
| 5,881,993 A | 3/1999 | Wilson et al. | 251/40 |
| 5,979,500 A | 11/1999 | Jahrling et al. | 137/624.12 |
| 5,984,262 A | 11/1999 | Parsons et al. | 251/129.04 |
| 6,000,674 A | 12/1999 | Cheng | 251/26 |
| 6,019,343 A | 2/2000 | Tsai | 251/30.02 |
| 6,056,261 A | 5/2000 | Aparicio et al. | 251/129.03 |
| 6,127,671 A | 10/2000 | Parsons et al. | 250/221 |
| 6,161,726 A | 12/2000 | Parsons et al. | 222/52 |
| 6,212,697 B1 | 4/2001 | Parsons et al. | 4/302 |
| 6,216,730 B1 | 4/2001 | Hall | 137/550 |
| 6,250,601 B1 * | 6/2001 | Kolar et al. | 251/129.04 |
| 6,293,516 B1 | 9/2001 | Parsons et al. | 251/129.04 |
| 6,299,127 B1 | 10/2001 | Wilson | 251/38 |
| 6,305,662 B1 | 10/2001 | Parsons et al. | 251/129.04 |
| 6,499,152 B2 | 12/2002 | Johnson | 3/302 |
| 6,619,614 B2 | 9/2003 | Parsons et al. | 251/129.04 |
| 6,860,282 B2 | 3/2005 | Guler | 137/1 |
| 6,978,490 B2 * | 12/2005 | Wilson | 4/249 |
| 2003/0116736 A1 | 6/2003 | Muderlak | 251/129.04 |

FOREIGN PATENT DOCUMENTS

| | | |
|---|---|---|
| TW | 57960 | 12/1996 |
| WO | WO 91/17380 | 11/1991 |
| WO | WO91/17380 | 11/1991 |
| WO | WO 94/24918 | 11/1994 |
| WO | WO 97/13086 | 4/1997 |
| WO | WO 97/13088 | 4/1997 |
| WO | WO 01/29464 | 4/2001 |
| WO | WO01/29464 | 4/2001 |

* cited by examiner

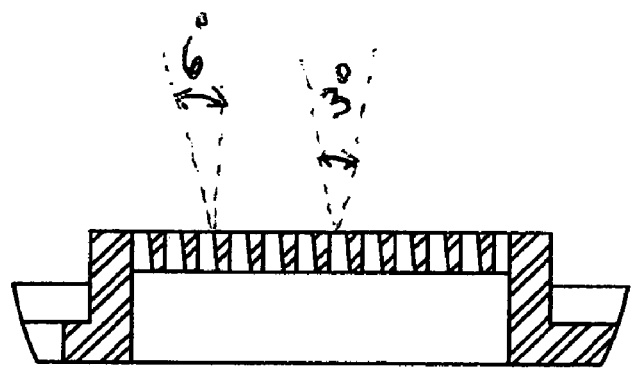
FIG. 10C-I
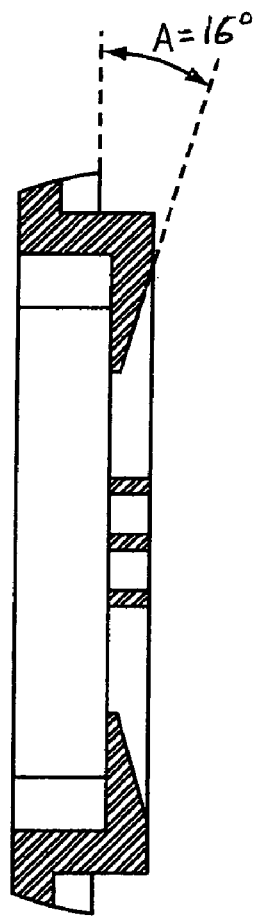
FIG. 10C-II

SYSTEM AND METHOD FOR CONVERTING MANUALLY OPERATED FLUSH VALVES

This application is a continuation-in-part of U.S. application Ser. No. 10/712,413, filed Nov. 10, 2003 now U.S. Pat. No. 7,063,103 which is a continuation-in-part of U.S. application Ser. No. 09/972,496, filed Oct. 16, 2001, now U.S. Pat. No. 6,860,282, and a continuation-in-part of U.S. application Ser. No. 09/916,468, filed Jul. 27, 2001, now U.S. Pat. No. 6,643,853, all of which are incorporated by reference in their entireties. This application also claims priority to U.S. Provisional Application 60/684,752, filed on May 26, 2006, which is incorporated by reference as if fully reproduced herein.

The present invention relates to a method and system for converting or retrofitting manually-operated flush valves, i.e., already installed flush valves.

The present invention relates to those flush valves commonly used to operate toilets and urinals and, more specifically, to an assembly that converts existing valves from manual to automatic operation. The flush valves may be a diaphragm-type valve, such as that sold by Sloan Valve Company of Franklin Park, Ill., under the trademark ROYAL, and which is shown in U.S. Pat. No. 6,216,730, or it may be a piston-type flush valve sold by Sloan Valve Company under the trademarks GEM and CROWN and shown, for example, in U.S. Pat. No. 5,881,993, or many other commercially available flush valves.

BACKGROUND

Customarily, a variety of flushing systems are used for flushing urinals and toilets: a first type includes a float-operated intake valve, mounted at a water intake pipe, for delivering water into a water tank. The intake valve includes a rod connected to a float which, when a predefined level of water has accumulated in the tank, closes the intake valve. An outlet fixture at the bottom of the water tank discharges the water in the water tank into the toilet bowl when the flush handle is activated to flush the toilet. During and after the flushing action, the float drops below a closing position, this opens the intake valve, and water flows into the tank until it reaches the predefined level. At that point, the float is once again at the level that closes the intake valve.

A second toilet flush system uses water directly from a supply line for flushing. This flush system uses a flush valve (i.e., a "Flushometer") that may be a diaphragm-type valve or a piston-type valve. This flush valve can be manually activated by depressing a handle (or can be automatically activated by a sensor) to control flushing a toilet or urinal. In these systems the flush valve controls a pilot section that is located somewhat above the diaphragm (in a valve diaphragm-type valve) or the piston (in a piston-type valve). The pilot section receives water through one or several control orifices. The valve controls pressure in the pilot section, which in turn activates water flow from the supply line to the toilet or urinal, thus creating the flush action.

In these diaphragm-type or the piston-type valves, the pilot section has control orifices with a quasi-fixed supply rate by virtue of maintaining a hydraulic condition known as "choked flow condition." The pilot section also includes a drain valve, which is activated by the user handle to lower pressure in the pilot section. Upon activation of the drain valve (which has a flow-through rate much higher than the control orifice feed rate), the pilot chamber is depleted, resulting in the opening of the main flow passage that facilitates the main flushing flow. After handle release, followed by drain valve reseal, the main passage will remain open until the pilot chamber refills through the pilot orifice. The water pressure in the pilot chamber closes the main water passage to seal water flow, as described in detail in connection with FIG. 1, below. These diaphragm-type and piston-type flush valves have been described in numerous publications and patents. For example, various diaphragm-type flush valves are described in U.S. Pat. Nos. 5,125,621; 5,456,279; 6,216,730, or PCT publication WO91/17380, and the piston-type flush valve is described in U.S. Pat. No. 5,881,993.

FIG. 1 shows a prior art diaphragm-type pilot flush valve for flushing a toilet or a urinal. Flush valve 10 has a valve body with an upper body part 18 and a lower body part 16 separated by a diaphragm 12. Diaphragm 12 rests on a valve seat 14, which is at the top of an inner wall 30 of lower body part 16. The upper body part 18 has a cap 20 that clamps portion (periphery) 59 of diaphragm 12 against lower body part 16 using an upper housing 22. In the closed position, water that entered through a water inlet pipe 24 sits in an annular main chamber 26 surrounding cylindrical inner wall 30 of lower body part 16. The sealing action of diaphragm 12 does not allow the water to flow from main chamber 26 through the main passage defined by inner wall 30 into a water outlet conduit 32 to the toilet bowl. That is, diaphragm 12 seals water outlet 32 when the valve is in the closed position.

Flush valve 10 also includes a pilot chamber 36 formed by the dome 20 and diaphragm 12. Diaphragm 12 includes a control orifice 34, which enables water flow from main chamber 26 to pilot chamber 36 and thus causes pressure equalization between main chamber 26 and pilot chamber 36. When the pressure is equalized, there is a net force on diaphragm 12 from pilot chamber 36 downward onto the diaphragm since the diaphragm area in pilot chamber 36 is larger than the opposing diaphragm area in main chamber 26. The downward-oriented net force keeps the diaphragm 12 seated on valve seat 14, and thus, the valve is closed and sealing water outlet 32. A pressure-relief mechanism that lowers the water pressure in pilot chamber 36 opens flush valve 10: the pilot valve includes a pilot valve member 50 with a rod portion 58 displaceable by a plunger 56 connected to a manual flush handle 54. Pilot valve member 50 sits on a pilot seat 52 and seals against the diaphragm 12.

Depressing handle 54 causes plunger 56 to move against rod portion 58 and displacing pilot valve member 50. When pilot valve member 50 is displaced, water flows with minimal flow resistance from pilot chamber 36 near pilot seat 52 through the relief opening 49, while control orifice 34 in the diaphragm causes considerable resistance to the compensating flow from main chamber 26 through orifice 34 to pilot chamber 36. Consequently, the pressure in pilot chamber 36 decreases significantly below the pressure in main chamber 26 so that the force exerted by the pressure in pilot chamber 36 is lower than that exerted by the pressure in main chamber 26. Thus, the portion of the diaphragm plate 38 located interior to its clamped portion 59 flexes upward, rising off the main valve seat 14; this opens the valve and water flows from main chamber 26 to water outlet 32.

When a user releases flush handle 54, pilot valve 50 returns to its position on pilot valve seat 52, but the pressure in the pilot chamber 36 does not immediately return to the level in the main chamber 26 because the pressure-equalizing flow from main chamber 26 to pilot chamber 36 is restricted by the small size of control orifice 34. This delay in pressure equalization is desirable because for a predetermined length of time water flows from water outlet 32 to the connected toilet or urinal. Ultimately, however, the water flow via control orifice 34 equalizes the pressure between main chamber 26 and pilot chamber 36 to the point at which the downward force on the diaphragm overcomes the upward force, and the valve closes. This entire flushing cycle is repeated by moving handle 54.

There are several existing design approaches used for converting (i.e., retrofitting) the existing manual flush valves, such as valve 10, to sensory-activated electronically controlled automatic valves. There is a top cover assembly that replaces the upper housing 22 (shown in FIG. 1). The top cover system includes an electronic sensory module, a battery pack, and electronics for controlling a bi-stable solenoid that acts upon a pilot valve. The pilot valve in turn controls the main diaphragm valve. The top cover conversion system usually includes a new main diaphragm assembly that replaces main diaphragm 12 (used in the manual system shown in FIG. 1). These types of conversion systems are described in U.S. Pat. Nos. 5,169,118 and 5,244,179.

Another type of sensory controlled flushing device is known as a "side mount" conversion device. Examples of these are described in U.S. Pat. Nos. 5,431,181, 5,680,879 and 6,056,261. Side mount devices include a sensory module (which senses a user of the facility), a battery pack, an electric motor, and an activation plunger mounted onto a common housing. Specifically, in the "side mount" device, the activation plunger is mounted onto the flush valve assembly after first removing a manual handle (e.g., handle 54 in FIG. 1). Upon receiving a flush command from the sensory module, the electronics activate the movement of the activation plunger, thereby activating the pilot valve, which in turn starts the flush cycle.

The installation of the "side mount" conversion device to make the manual flusher automatic requires removal and replacement of its flush handle, and handle removal requires breaking the existing water seal. Specifically, to install some of these retrofit devices, a person may need to turn the water supply off, dismantle portions of the flush valve, install the device, reestablish the water seal, and then turn the water supply back on. Even if the water supply does not need to be turned off, the installation requires removal of the manual flush handle. Thus, in either case, installation requires the job to be performed by a qualified professional.

Most conversion or retrofit devices have a manual override mechanism, i.e., the ability to override the sensory control and start a flushing cycle, if the control malfunctions. These systems usually have an electrical switch that bypasses the optical sensor to electronically trigger flushing, which can be done by pushing a button, for example. However, many of these systems do not allow for a "truly" manual override if there is no electrical power available, as these electrical switches cannot work during power source failure. Therefore, such conversion devices cannot start a flushing cycle by either sensory or manual means during a power failure. There is still, therefore, a strong need for reliable devices to convert or retrofit manually-operated, currently installed flush valves used in toilet rooms.

SUMMARY OF THE INVENTION

The present invention relates to toilet room flush valves and more specifically to an assembly for converting a valve of this type from manual operation to automatic operation. A primary purpose of the invention is to provide a conversion assembly that can be installed without the removal of any flush valve components of an existing, manual flush valve, and without disconnecting the water supply to the flush valve.

The present invention is a conversion assembly that is easily mounted on the manual flush valve, and the conversion assembly displaces the flush valve handle to cause the water flush when the operation is initiated by an automatic sensor, or when a user manually presses on a movable member.

According to one aspect, the present invention includes a conversion system for converting an installed manually-operated flush valve used with a urinal or toilet. The conversion system includes a power module, a control module, and a driver module arranged for mechanical, hydraulic or other coupling to the manually-operated flush valve.

According to another aspect, the present invention includes a conversion system for converting an installed manually-operated flush valve used with a urinal or toilet. The conversion system includes a power module, a control module, a driver module coupled to the manually-operated flush valve, and a passive optical sensor including a light detector constructed to detect ambient light arriving to said detector from a detection field. The control module is constructed to control activation of the driver module based on a signal from said passive optical sensor.

Preferred embodiments of these aspects may include one or more of the following features: The control module includes a sensor. The sensor may be an optical sensor, an ultrasonic sensor, a capacitive sensor, or any other sensor. The sensor may be constructed to detect motion near the flush valve or to detect a user's presence near the flush valve. The optical sensor is preferably an active sensor or a passive sensor. The active sensor is preferably an infrared sensor.

The control module may be constructed to determine each activation based on a background level of the ambient light and present levels of the ambient light measured over several time intervals by the light detector.

The control module is constructed to determine activation of the driver module by executing a detection algorithm employing detection of increase and decrease of the ambient light due to the presence of a user within the detection field.

The control module may be constructed to determine each activation based on a background level of the ambient light and present levels of the ambient light measured over several time intervals by the light detector. The control module may be constructed to sample periodically the detector based on the amount of previously detected light.

The passive optical sensor may include an optical element located in front of the light detector arranged to partially define a detection field and eliminate invalid targets. The optical element may be further constructed to provide the detection field being angled below horizontal, or being angled above horizontal. The optical element may be further constructed to provide the detection field being angled to the right or to the left of the flusher.

The passive optical sensor may include an optical element located in front of the light detector arranged to partially define a detection field and eliminate invalid targets, and the control module is programmed to execute a calibration routine that accounts for the size and orientation of the detection field defined by the optical element.

The light detector is constructed to detect light in the range of 400 to 1000 nanometers, and preferably detect light in the range of 400 to 800 nanometers.

The control module may be constructed activate the driver module based on first detecting arrival of a user and then detecting departure of the user. Alternatively, the control module may be constructed activate the driver module based detecting presence of a user. The control module may be constructed activate the driver module based on registering arrival of a user after the detector detects increased amount of light.

The optical element may include a lens, a pinhole (or an array of pinholes), a slit (or an array of slits), an optical filter, or a collimation plate. The collimation plate may form a gravity shutter. The light detector may include a photodiode or a photoresistor. The optical element may be constructed so that the light detector receives light in the range of 1 lux to 1000 lux.

The driver module may include a gear mechanism mechanically coupled to a displacement member. The displacement member includes a proximal region coupled to the gear mechanism and a distal end shaped to provide contact with the manual handle. The power module includes a battery and the driver module includes an electromotor powered by the battery and coupled to a displacement member.

According to another aspect, the invention is a conversion system for converting an installed manually-operated flush valve used with a urinal or toilet. The conversion system includes an externally mounted conversion assembly including a power module, a control module including a sensor, and a driver module mechanically coupled to a displacement member arranged to externally activate the manually-operated flush valve using a manual valve handle.

Preferred embodiments of this aspect may include one or more of the following features: The sensor may be an optical sensor or ultrasonic sensor. The sensor may be constructed to detect motion near the flush valve, or to detect a user's presence near the flush valve. The sensor may be an infrared sensor. The displacement member includes a proximal region coupled to the gear mechanism and a distal end shaped to provide contact with the manual handle. The power module includes a battery and the driver module includes an electromotor powered by the battery and coupled to a displacement member.

Preferred embodiments of both of the above aspects may include one or more of the following features: The conversion assembly does not include any part in direct contact with a water passage of the manually-operated flush valve. The manually-operated flush valve includes a diaphragm-type valve mechanism or a piston-type valve mechanism.

The displacement member is constructed and arranged to rotate or move linearly (or both) when acting on the manual handle. The manually-operated flush valve mechanism may include a piston-type mechanism, a diaphragm-type mechanism or another related mechanism.

The control module may include one or even several sensors. The external sensor may be an optical sensor, or an ultrasonic sensor, either of which may sense presence or motion of a user, or both. The internal sensor may sense operation of the flusher including the line water pressure. This sensor may sense the pressure on the manual handle during the flush, excursion of the handle or other parameters.

BRIEF DESCRIPTION OF THE DRAWINGS

FIG. 2A-I is a view of gravity shutter found in the conversion assembly shown in FIG. 2

FIG. 2B is a perspective view of the conversion assembly shown in FIG. 2 prior to being mounted from the right-hand side on the manual flusher shown in FIG. 1.

FIGS. 10C-I and 10C-II are cross-sectional views of slots located in the collimation plate shown in FIG. 10C.

FIG. 10D is a perspective exploded view of an alternative embodiment of the optical sensor shown in FIG. 10B.

FIG. 10E is a front view of the alternative embodiment of the optical sensor shown in FIG. 10D.

DESCRIPTION OF THE PREFERRED EMBODIMENT

The present invention relates to a conversion assembly for manually-operated toilet room flush valves, which may be of the diaphragm or of the piston type. A diaphragm-type flush valve is shown in U.S. Pat. No. 6,216,730, the disclosure of which is herein incorporated by reference, and is sold by Sloan Valve Company, the assignee of the present application, under the trademark ROYAL. The piston-type flush valve may be of the type shown in U.S. Pat. No. 5,881,993, the disclosure of which is herein incorporated by reference, and may be sold by Sloan Valve Company under the trademarks GEM or CROWN.

The conversion assembly will utilize a sensor, which may be of the infrared type, will be battery powered, and may be as shown in U.S. Pat. No. 6,056,261, also owned by Sloan Valve Company, and the disclosure of which is herein incorporated by reference. Sensor-operated, battery powered flush valves are known in the art from the '261 patent and others. The present invention utilizes the technology in the '261 patent or similar technologies for infrared operation of a flush valve which may be of the types described in the above-referenced patents. The particular disclosure shown herein illustrates a valve of the ROYAL type.

Figure 1:
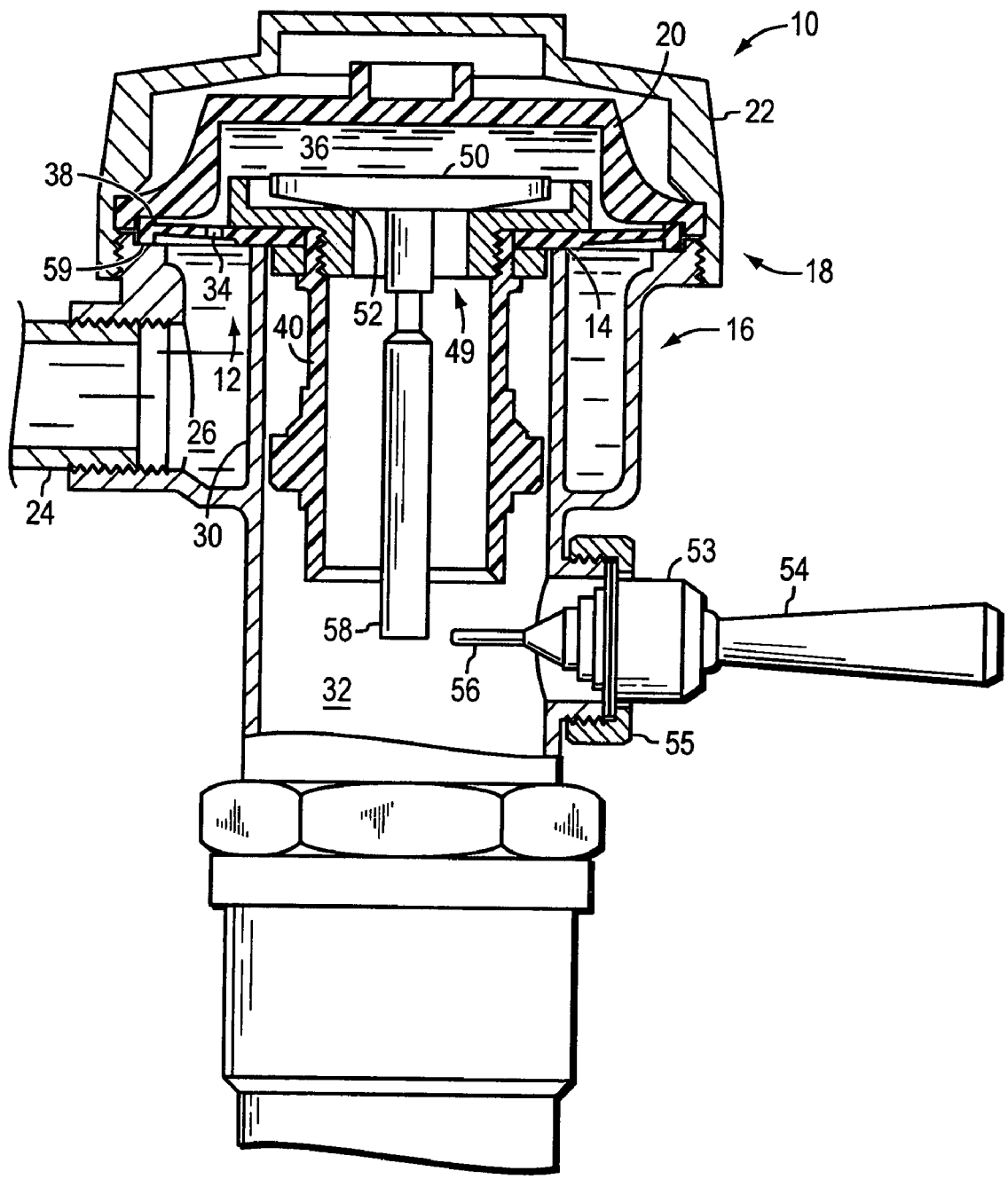
FIG. 1 is a cross-sectional view of a diaphragm-operated manual flusher, according to the prior art.

In the drawings, a flusher is indicated at 10. As shown in the cross-sectional view of a diaphragm-operated manual flusher in FIG. 1, a valve body has a manual handle 54 mounted to the flush valve body 10 by a collar 53 and a coupling nut 55. The handle 54 pivotally moves about an axis when the handle is used to cause operation of the flush valve. The present invention provides an automatic means for moving the otherwise manually-operated handle.

Figure 2:
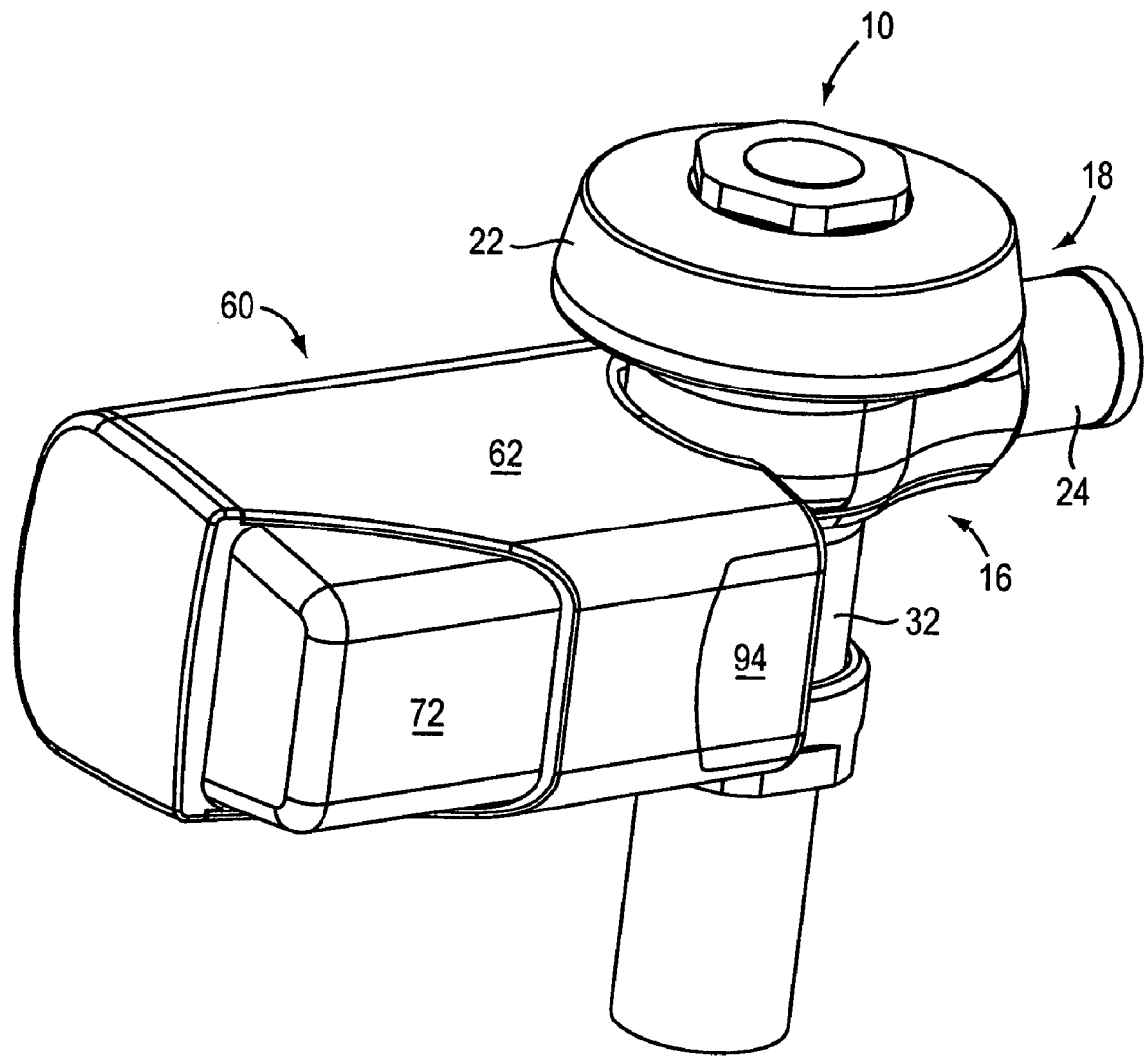
FIG. 2 is a perspective view of a side-mounted conversion assembly for converting the manual flusher of FIG. 1 to an automated flusher.
Figures 1, 2A:
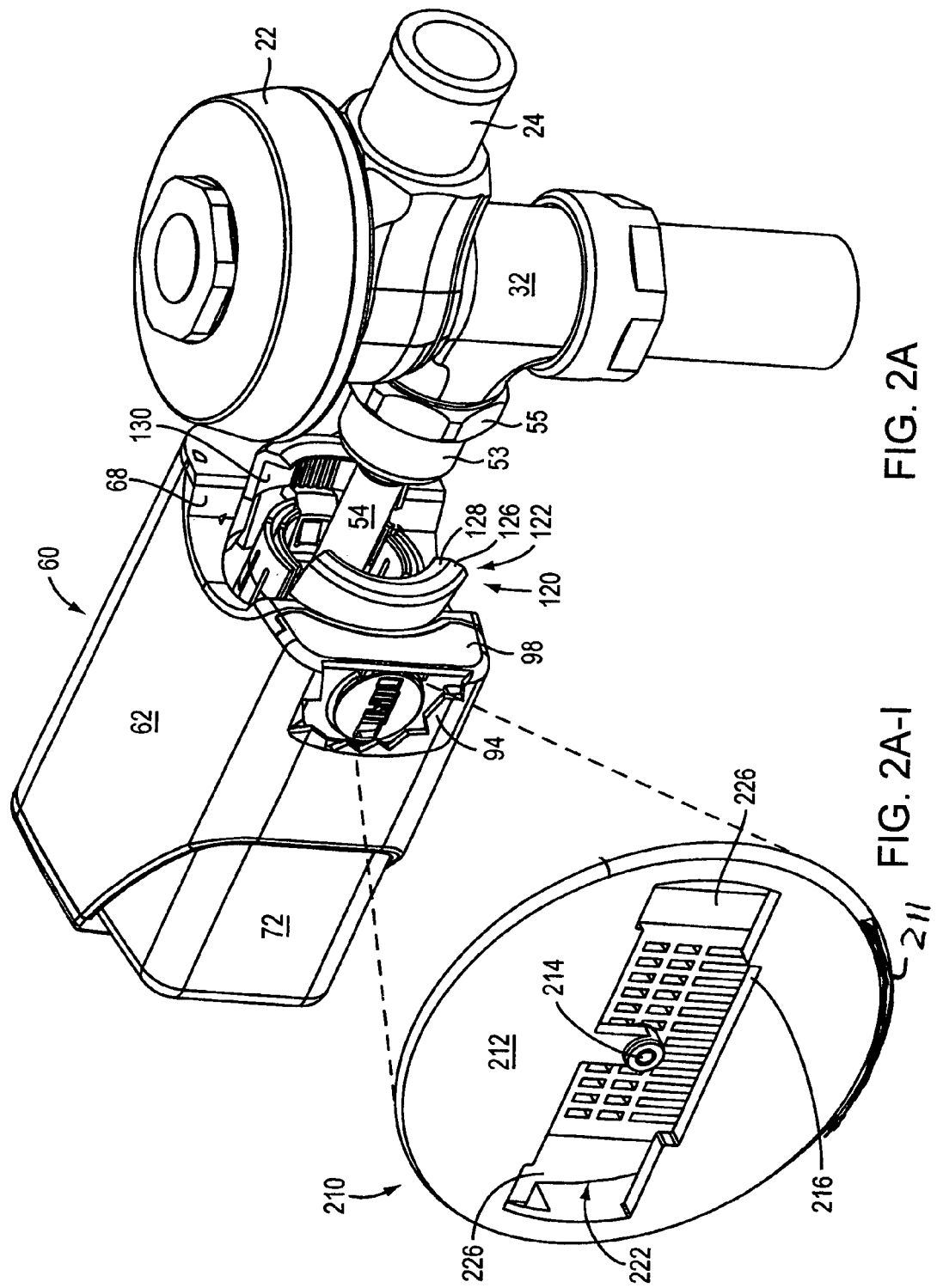
FIG. 2A is a perspective view of the conversion assembly shown in FIG. 2 prior to being mounted from the left-hand side on the manual flusher shown in FIG. 1.
Figure 2B:
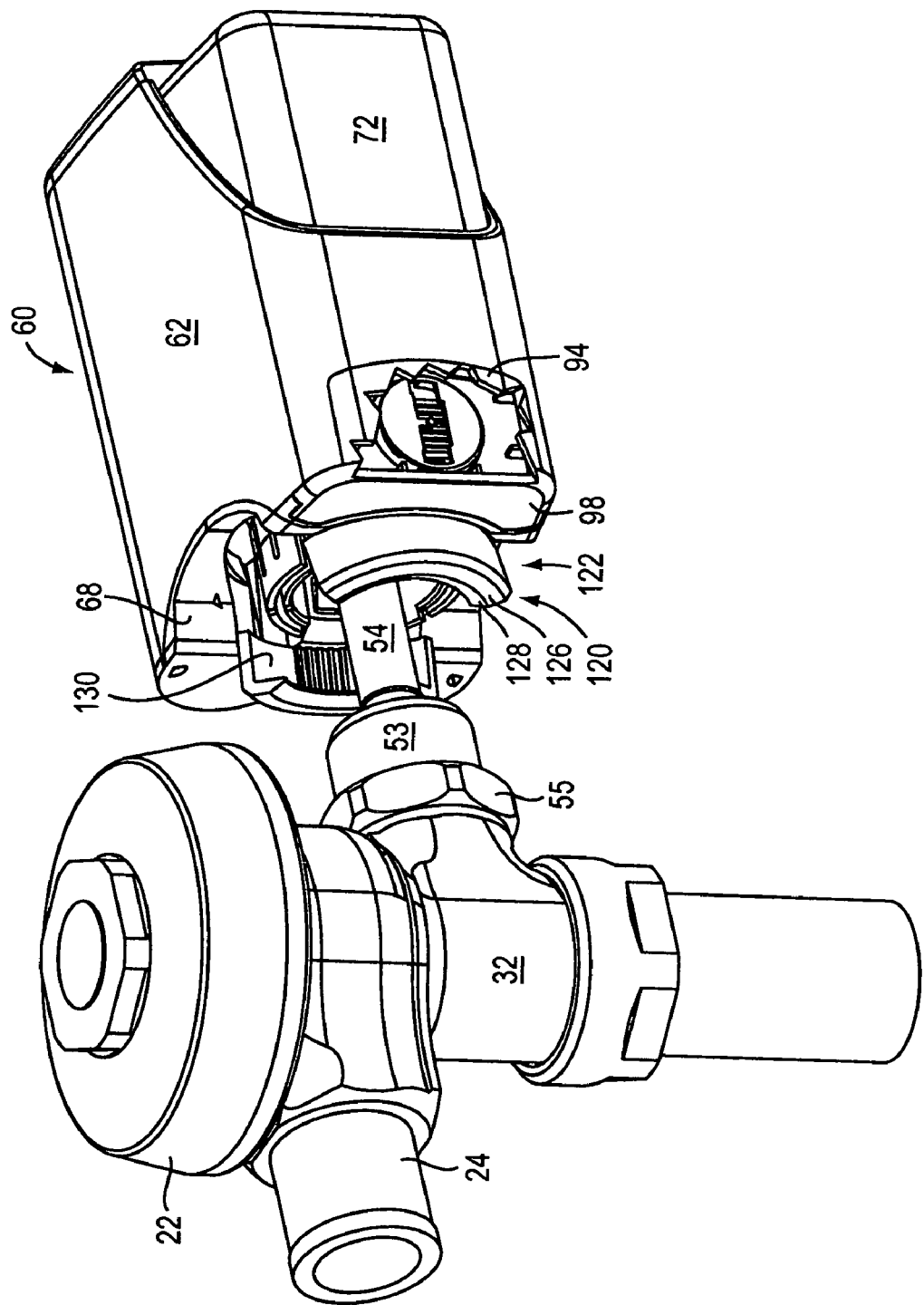

FIG. 2 shows a conversion assembly 60 in a perspective view, when mounted onto flusher 10. Conversion assembly 60 includes a driver module 70, a power module 80, a control module 90 (see FIG. 3) and, as shown in FIGS. 2A and 2B, an attachment lock-in module 120 for mounting the conversion assembly 60 to the flusher.

Conversion assembly 60, using attachment lock-in module, is mounted to the flusher, resting on lower body part 16 and water outlet conduit 32, and attaching to the flusher handle's collar 53 and coupling nut 55 via attachment lock-in module 120. Attachment module 120 is designed for slidable lock-in attachment and controlled unlocking and removal. The control/optical module 90 of conversion assembly 60 senses the user of the facility through an optical window 94. Conversion assembly 60 also has a driver module 70 designed to move the flusher handle and a power module 80 to power the entire conversion assembly 60. Driver module 70 is also constructed to provide manual override: the user can flush manually by pressing on the driver module enclosure 72, thereby pressing handle 54, as seen in FIG. 2A or 2B. The location of all of these components within a conversion assembly housing 62 (in this embodiment, a cast zinc housing) is shown in more detail in FIG. 3.

Conversion assembly 60 may be mounted on flushers with handles on the right or left-hand sides. FIG. 2A shows the conversion assembly unit 60 prior to mounting it to the flusher from the left-hand side, showing the attachment lock-in module 120 as it will fit around flusher handle 54, coupling nut 55 and cylindrical handle housing 53. As shown in FIG. 2B, conversion assembly 60 may also be mounted on the right-hand side. The conversion assembly is simply rotated 180 degrees, so that the optical window is still facing potential users. Attachment module 120 is able to mount conversion assembly 60 either way, and optical module 90 is able to detect users whether conversion assembly 60 is placed on one side or the other. It is able to do this due to optical module 90's ability to function when placed on either side, and a gravity shutter 210's ability to rotate about an axis. FIG. 2A-I shows a gravity shutter 210 found behind optical window 94. Gravity shutter 210 has an opening 216. An opaque plastic plate 212 has a swivel hole 214 that allows it to rotate around a pin 208 (see FIG. 10A), as well as a weight rim 211 that forces it to sit with an opening 216 always upright, in a "U-shape". Gravity shutter 210, a collimation plate 220 and other components of optical module 90 are explained in further detail in the descriptions of FIGS. 10B and 10C.

Figure 3:
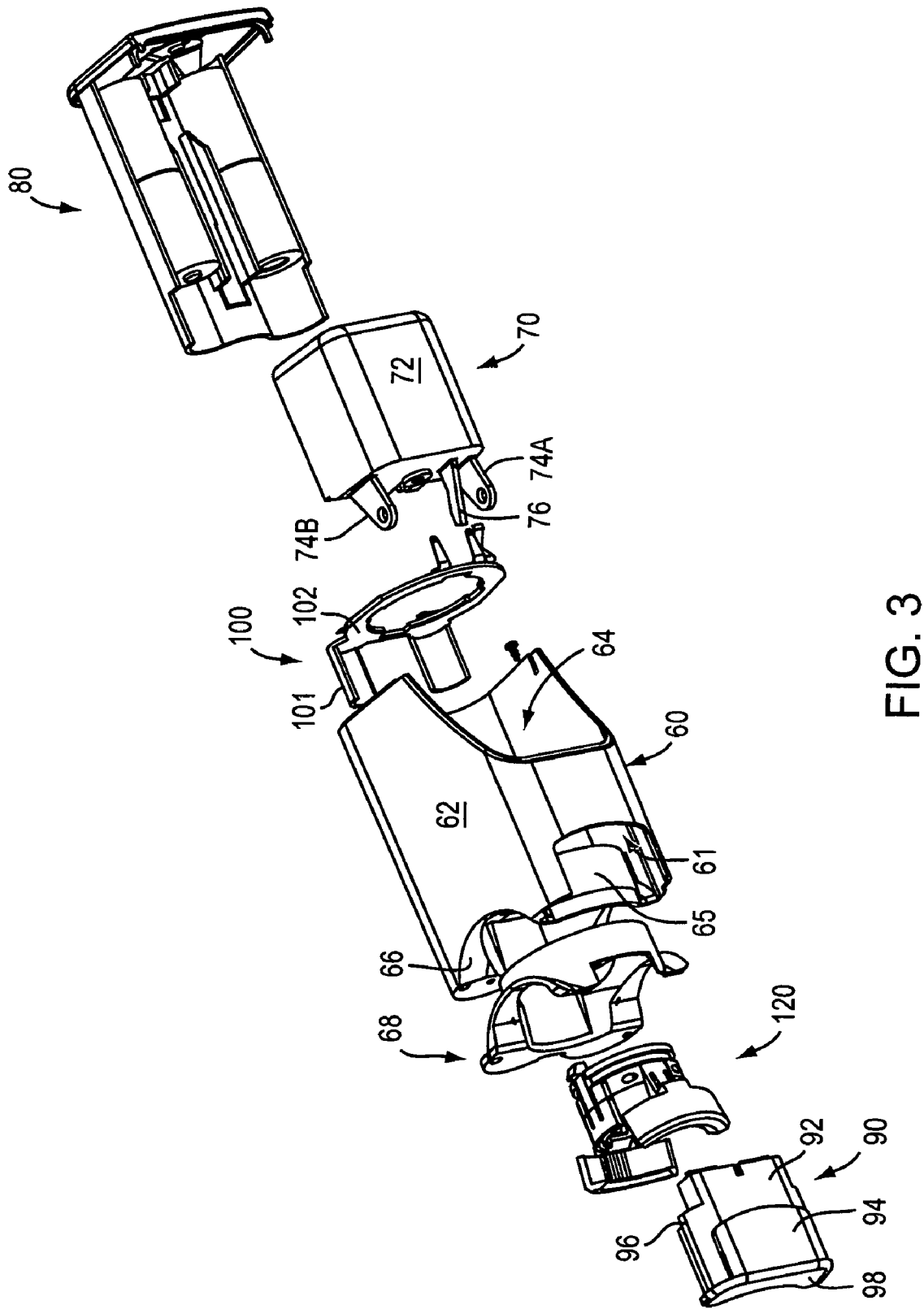
FIG. 3 is an exploded, perspective view of the conversion assembly shown in FIGS. 2, 2A and 2B.

FIG. 3 is an exploded view of conversion assembly 60 illustrating all major parts as they fit within the conversion assembly housing 62. All modules are held within a conversion assembly housing cavity 64. The individual modules are all located inside, their corresponding bodies shaped to have complementary body surfaces that fit together like a three-dimensional puzzle. Optical module 90 is proximal to the attachment module 120, which latches onto an anterior side opening 66 of conversion assembly housing 62. When connecting attachment module 120 to the rest of conversion assembly 60 and its housing 62, an attachment interface 68 made of rubber or a similar material is included between them. The posterior of conversion assembly housing cavity 64 holds driver module 70 and power module 80, as well as contact unit 100, which includes a body coupling 101 and a support plate 102. Contact unit 100 is used to provide electrical contacts between driver module 70, power module 80, and control module 90. Contact unit 100 connects batteries of power module 80 to driver unit 70 when the sensor detects use of the facility.

Figure 9:
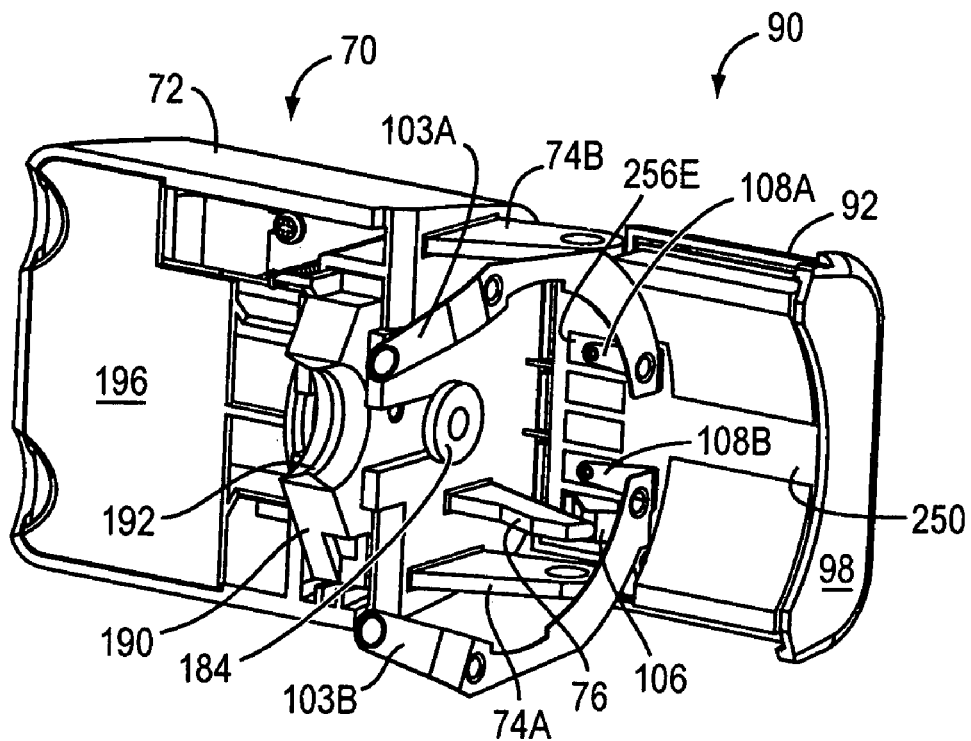
FIG. 9 is a perspective view of the driver module, shown in FIGS. 5 and 6, and a control module.
Figure 9A:
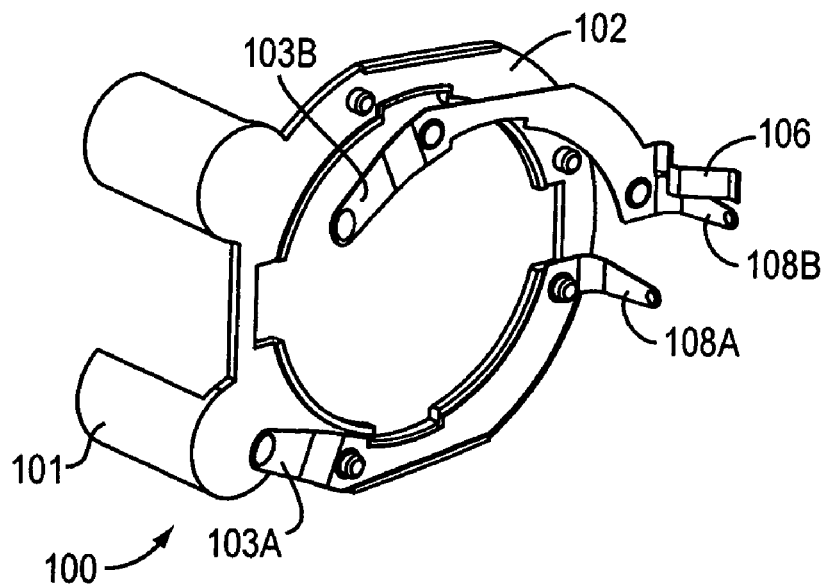
FIG. 9A is a perspective view of electrical contacts also shown in FIG. 9.

Referring to FIGS. 3, 9 and 9A, contact unit 100 includes a body coupling 101, a support plate 102, and a set of electrical contacts (103A and B, 108A and B, 106). The driver module body 72 pivots about hinges 74A and B. Driver module body 72 includes a contact arm 76, which interfaces with contact unit 100 for setting off conversion unit 60 when use of the facility is sensed. Optical module 90 includes an enclosure cover 92, an optical window 94, and an upper enclosure surface 96, and is held within the anterior portion of conversion assembly housing cavity 64, enclosed by an anterior assembly wall 98, in a control module slot (cavity) 61.

Figure 4:
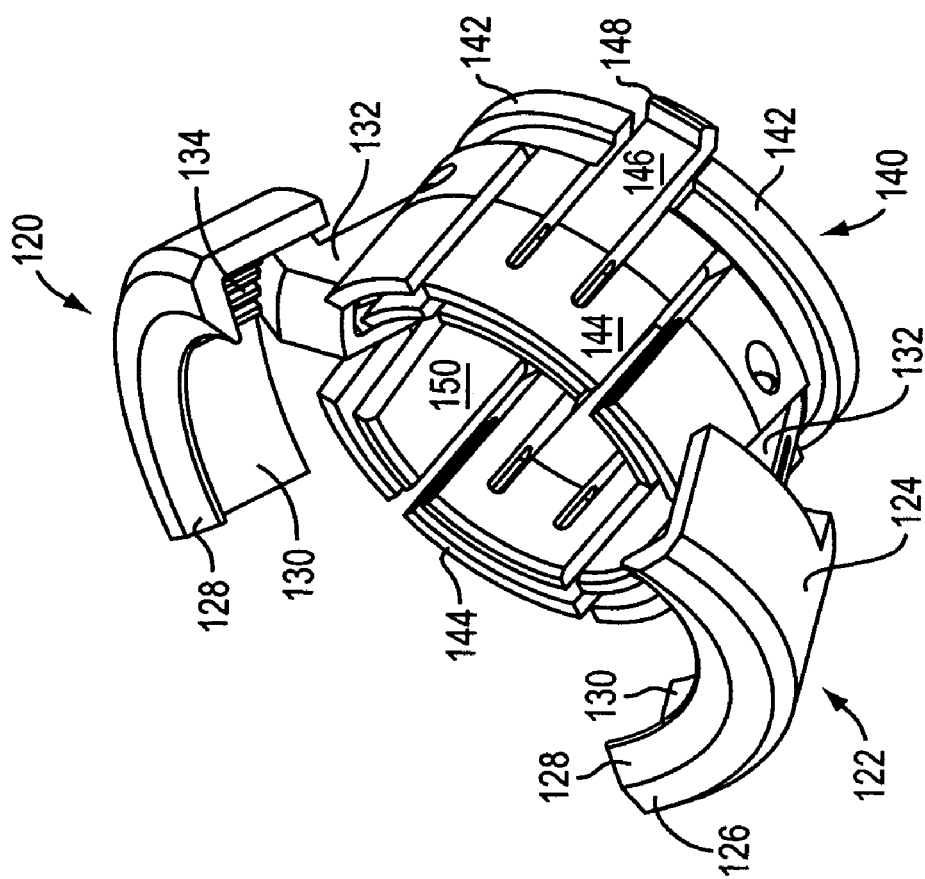
FIG. 4 is a perspective view of an attachment module of the conversion assembly shown in FIGS. 2A and 2B.
Figure 4A:
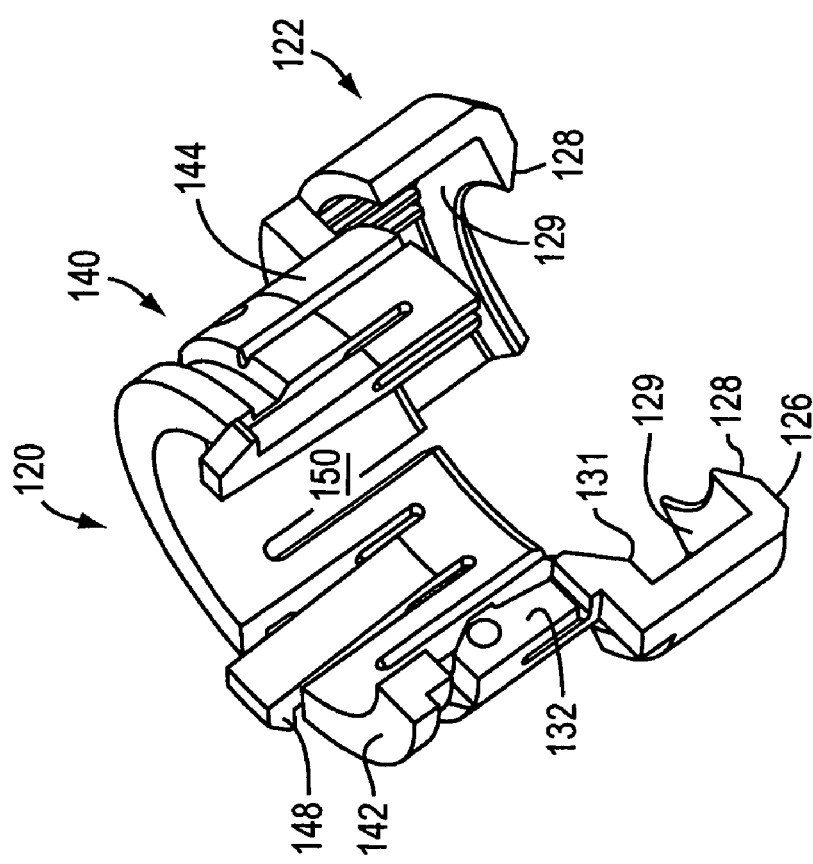
FIG. 4A is a cut-away view of the attachment module shown in FIG. 4.

FIGS. 4 and 4A show attachment lock-in module 120, including lock-in jaws 122 and a collet 140. Lock-in jaws 122 include an external rim 126, a chamfered surface 128 and an inner surface 130. Lock-in jaws 122 are pivotably mounted with respect to collet 140 using two pivotable arms 132. Optionally, lock-in jaws 122 may include, on an inner surface 130, alignment ribs 134, which provide alignment with coupling nut 55. Collet 140 includes a guide rim 142 attaching a substantially cylindrical external surface member 144 and an inner surface member 150, and levers 146 each connected to a latch 148. Attachment module 120 is designed to mount conversion assembly 60 onto the flusher body.

Figure 4B:
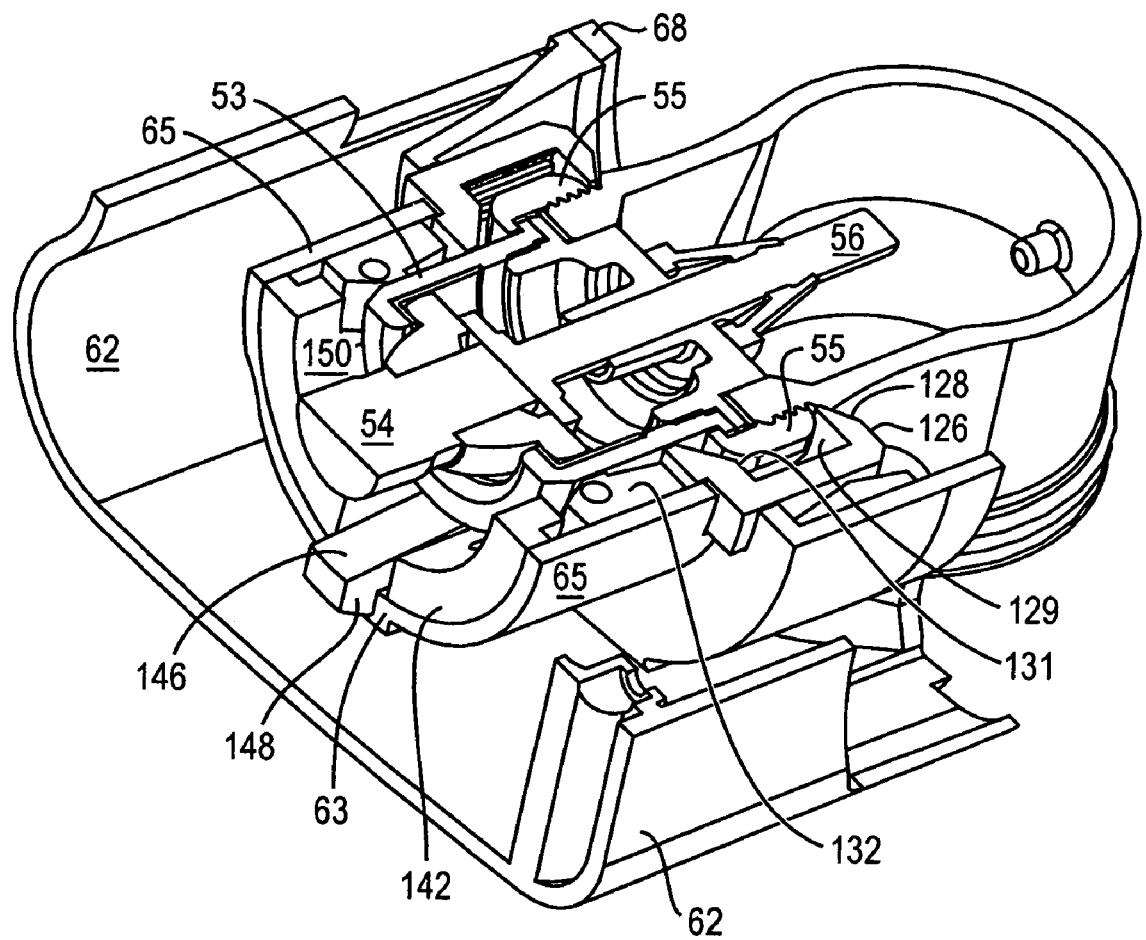
FIG. 4B is a perspective, cross-sectional view of the attachment module shown in FIGS. 4 and 4A, while mounted on the manual flusher shown in FIG. 1.

FIG. 4B shows a perspective cross-sectional view of attachment module 120, generally located on and attached to coupling nut 55 and cylindrical handle housing 53, all now within conversion assembly housing 62. During attachment, inner retention surfaces 129 and 131 of lock-in jaws 122 are positioned over coupling nut 55, and inner surface 150 is in contact with handle collar 53. Outer elements 144 (FIGS. 4 and 4A) are, in turn, in contact with collet guide 65, which is on the anterior side opening 66 of conversion assembly housing 62 (FIG. 3), and is attached to and removable with housing 62. Collet guide 65 also includes housing retention surfaces 63 designed for locking with latches 148 at the end of levers 146. Outer cylindrical elements 144 (FIGS. 4 and 4A) have a conical shape and, together with inner cylindrical elements 150, form a compression fitting that is located between flush handle collar 53 and collet guide 65 wherein a guidance rim 142 restrains these elements in a spring-like manner. Thus, attachment module 120 is constructed for coupling onto collar 53 and coupling nut 55, and no special tools are required to install conversion assembly 60. This arrangement also provides for a sturdy connection between conversion assembly 60 and manual flush valve 10. Further, if removal of conversion assembly 60 is necessary, an insertion tool is used so that the cantilever arm 146 is pressed down to release latch 148, and thus releases front opening 66 and attachment interface 68 of conversion assembly 60.

Referring again to FIG. 3, front opening 66 and attachment interface 68 not only provide for tight coupling to different types of manual flush valves, but also substantially prevent rotation of conversion assembly 60 with respect to the longitudinal axis of flush handle 54.

Figure 5:
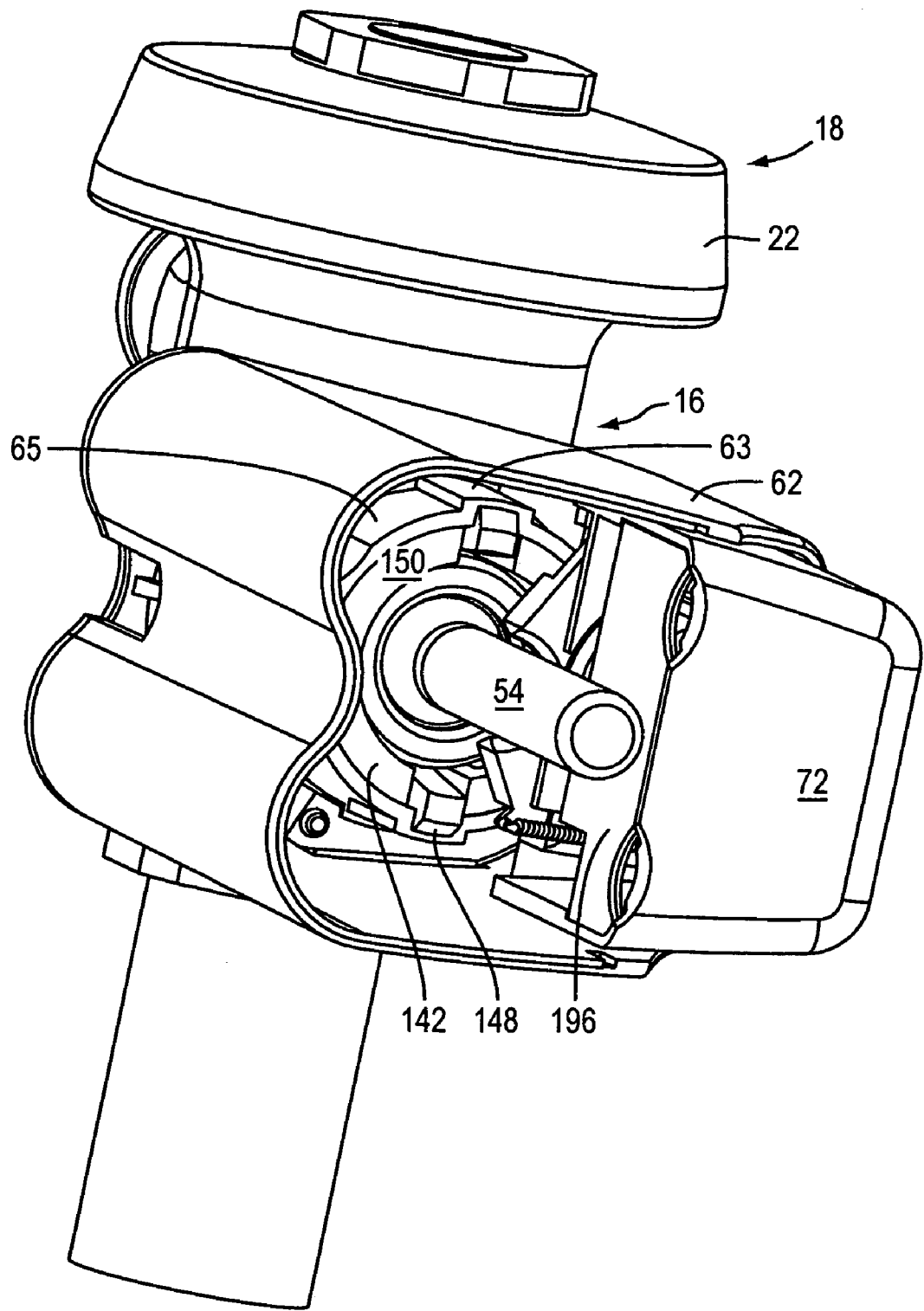
FIG. 5 is a perspective view of the conversion assembly mounted on the manual flusher, as shown in FIG. 2, but having the power module removed to expose the location of the manual flush handle.

FIG. 5 illustrates the relationship of handle 54 to conversion assembly 60 (when power module 80 is removed). FIG. 5 shows latch 148 holding attachment module 120 to housing retention surface 63, which attaches it to conversion assembly housing 62. Driver module body 72 is preferably in contact to handle 54, to move it and set off manual flushing action when necessary. There may be a pliable layer located to accommodate manual handles of different thicknesses. Driver module 70 provides the movement necessary for automatic operation of the flusher.

Figure 6:
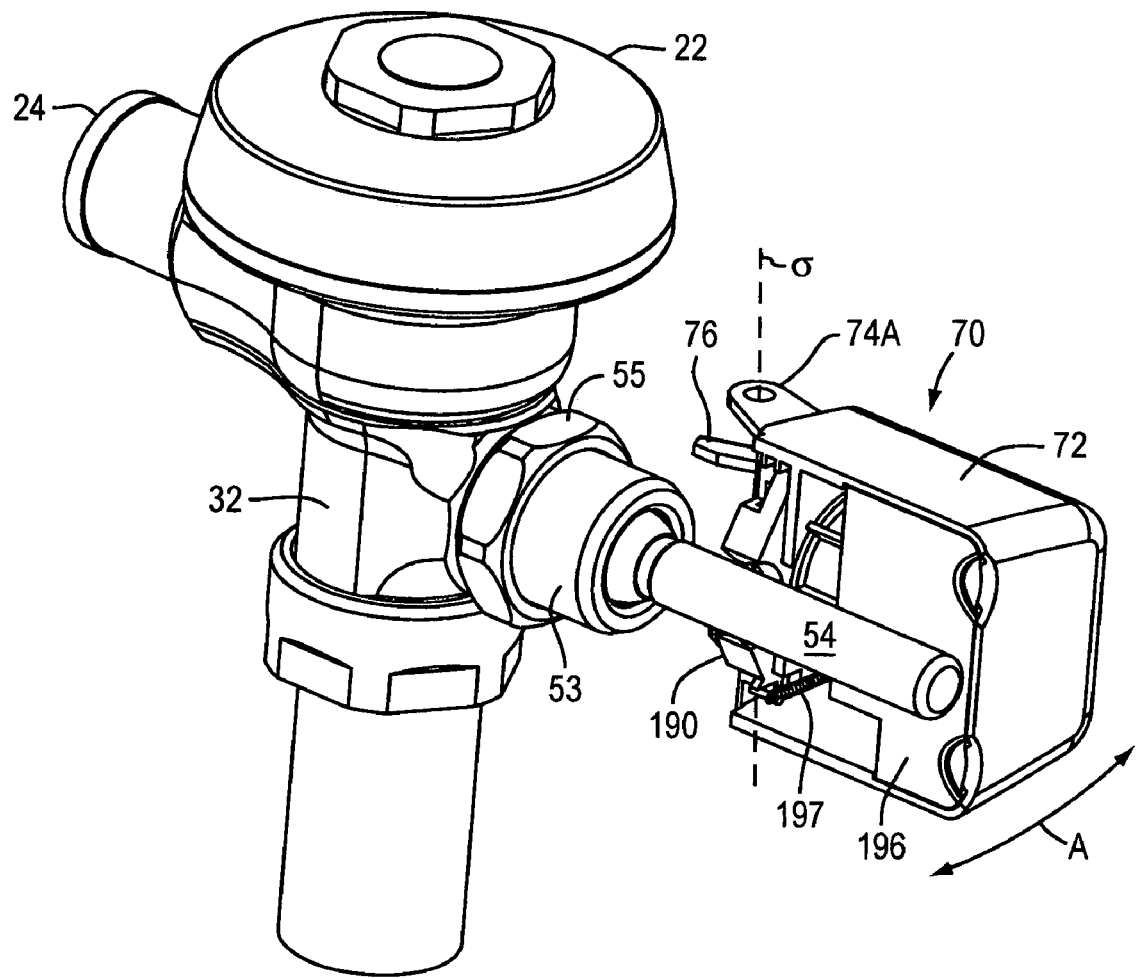
FIG. 6 is a perspective view illustrating the relationship of the manual flush handle and the driver module shown in FIG. 5.

FIG. 6 demonstrates the relationship of flusher 10, its handle 54, and driver module 70 and its components. Driver module body 72 has hinges, 74A and 74B, one of which is visible in the view of FIG. 6, which allow body 72 to pivot about axis σ. When conversion assembly 60 is used to flush manually, and body 72 is pushed towards the viewer by the user as shown by arrow A, an activation arm 190 makes contact with and moves handle 54, causing flushing to occur. Driver body 72 does not rotate about axis a when conversion assembly 60 flushes automatically, however. Automatic flushing will be further explained with connection to FIGS. 8 and 8A. In fact, because of this possible rotation about axis σ, a spring 197 is included with the unit to prevent shifting of driver module enclosure 72 relative to body cavity 64 during shipping (i.e., when the unit is not installed). Spring 197 holds the driver module enclosure external to body cavity 64 prior to installation when there is no flusher handle 54 to hold driver module 70 outside of body cavity 64.

Figure 7A:
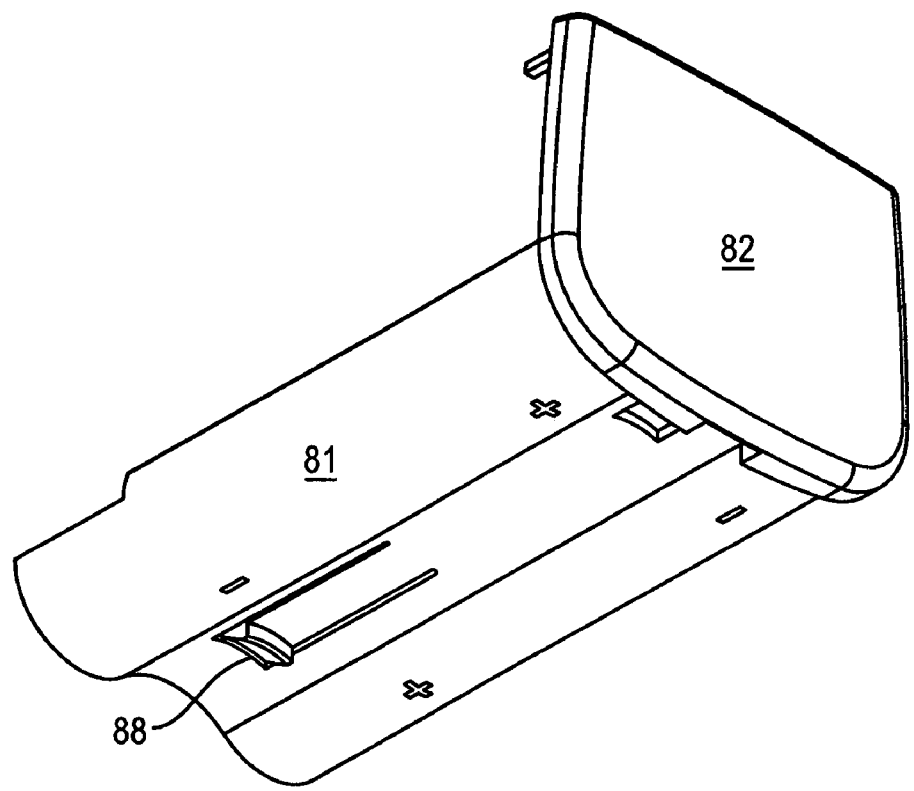
FIGS. 7 and 7A are perspective views of a power module used in the conversion assembly of FIG. 3.
Figure 7:
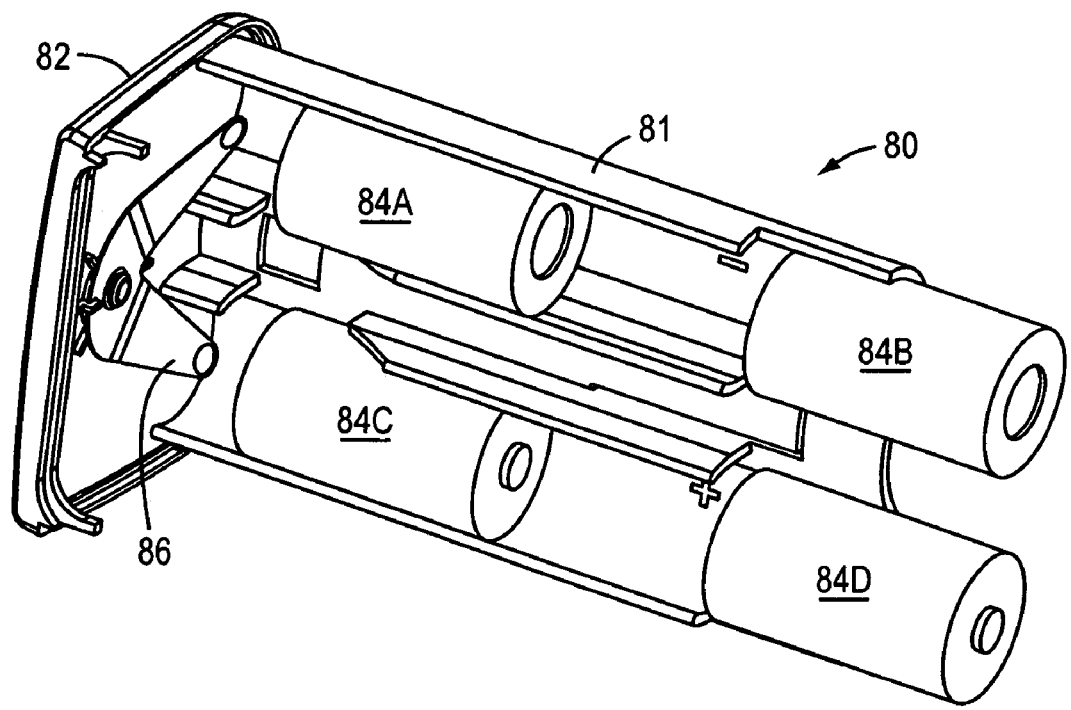

FIGS. 7 and 7A show power module 80 including a power module body (battery pack) 81 with four batteries 84A-D, by a posterior body wall 82 of conversion assembly 60. The power module latches onto, and sits within, housing 62. Batteries 84A-D sit within battery pack 81 in a serial arrangement, and when in place, touch battery contacts 86. Power module body 81 can be opened for replacement of batteries 84A-D via a latch 88.

Figure 8:
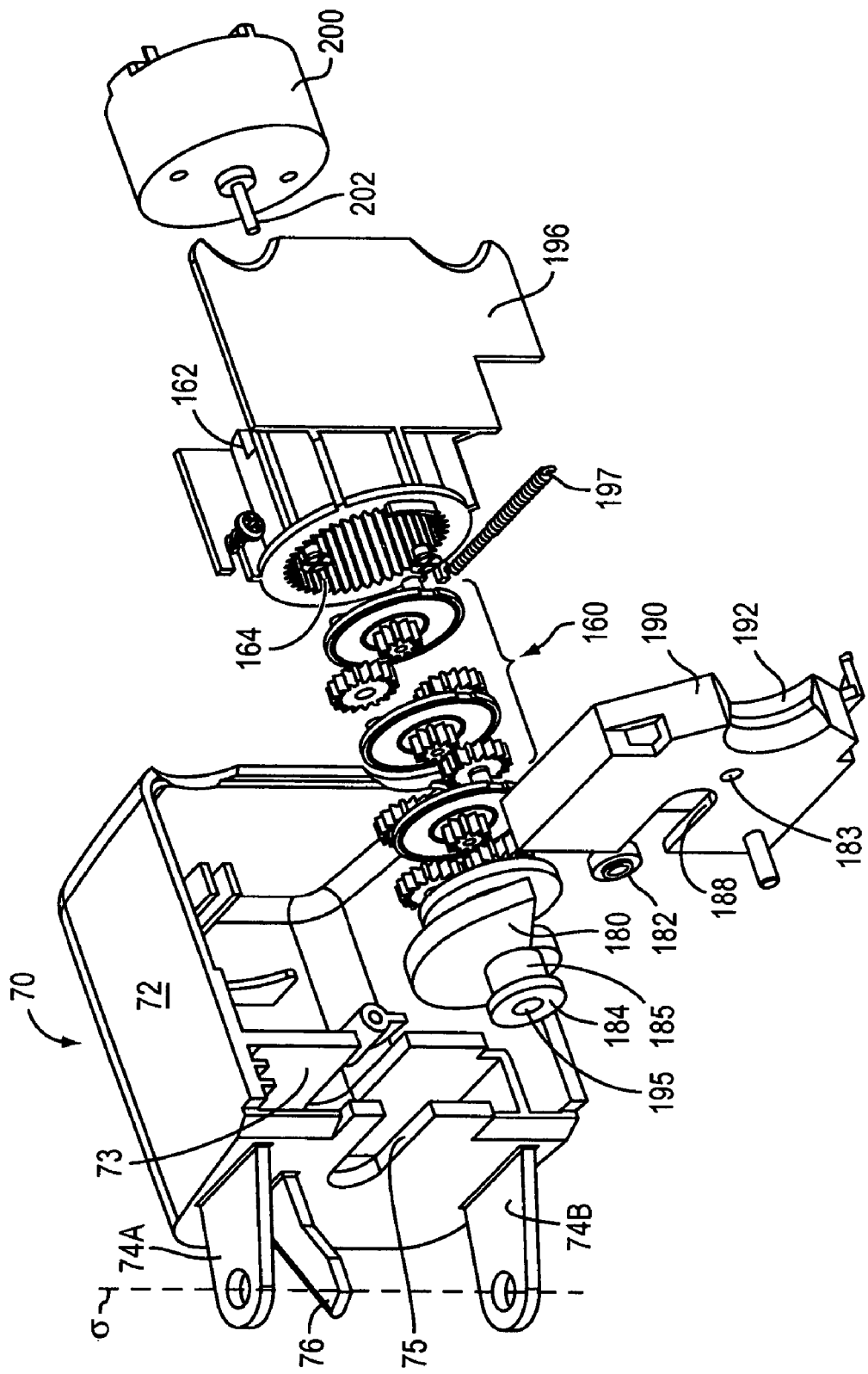
FIG. 8 is a perspective, exploded view of the driver module shown in FIGS. 3, 5 and 6.
Figure 8A:
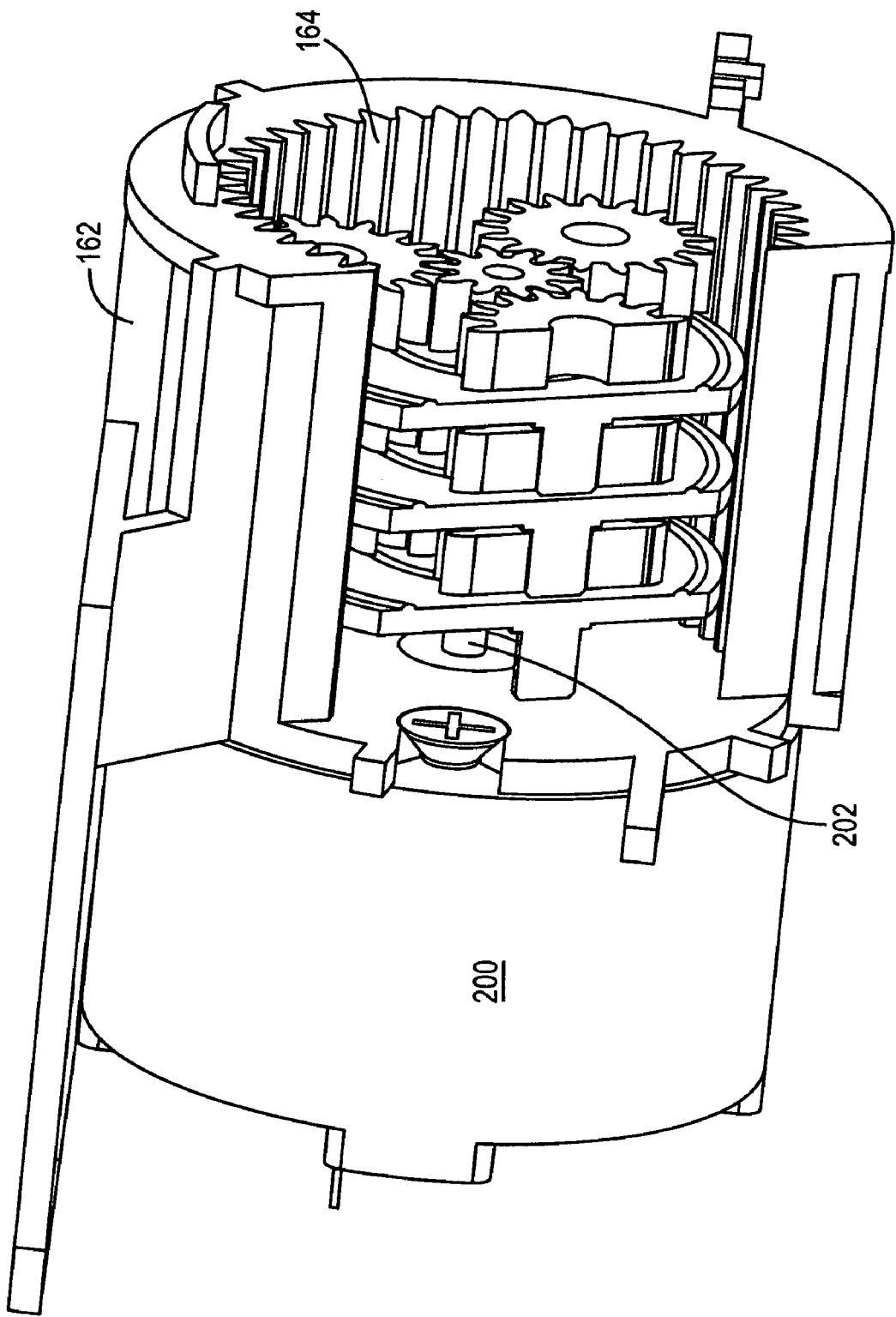
FIG. 8A is a perspective, partially cut away view of a gear assembly used in the driver module shown in FIG. 8.

FIG. 8 is a perspective, partially cut away view of driver module 70. As shown, driver module 70 includes a DC motor 200, which is engaged to a planetary gear assembly 160. Motor 200 has a drive shaft 202 which is coupled to, and acts upon, the gear assembly's first gear. The planetary gear assembly 160 is within a gear housing 162, whose surface 164 catches the teeth of the gears. An attached camshaft 195 is moved in the same direction as the motor's drive shaft 202 by the gear assembly and is held horizontally by openings molded into the driver module body 72. These components, as they fit together, are shown in FIG. 8A, which is an exploded view.

As shown in FIG. 8, a cam bearing 185 fits within an opening 75 in driver module body 72, with an axial stop 184 holding camshaft 195 in place. The camshaft is similarly held on the other side of a driver module body pocket 73. A cam 180 fits within pocket 73. An activation arm 190 has several surfaces for contacting parts of the assembly. In particular, a U-shaped cradle 192 accommodates the flusher handle, and makes contact with it, as shown in FIG. 6. Cam bearing 185 fits within a slot 188 of activation arm 190. A roller 182, held within activation arm 190 by a roller pivot hole 183, is turned by cam 180 when the motor is activated. Thus, activation arm 190 sits on the camshaft, with cam 180 within it. Upon a signal from control module 90, the motor 200 is activated, turns the gear assembly 160, and drives camshaft 195 to turn. As camshaft 195 turns, cam 180 acts on and turns roller 182. As the protruding curve of cam 180 turns roller 182, it pushes activation arm 190 outwards. As arm 190 moves outwards, it in turn pushes the flusher handle 54, which is held in U-shaped cradle 192, thus causing the flushing action.

Referring to FIGS. 9 and 9A, contact unit 100 provides the electrical contacts between power module 80's batteries and the rest of conversion assembly 60. Contact unit 100 is in front of an inner housing wall 250, separating it from the components of control module 90, which are behind wall 250. FIG. 9 is a perspective view of the contents of driver module 70 and control module 90. Activation arm 190 and its U-shaped cradle 192, which engages flusher handle 54, are visible. Axial stop 184 of camshaft 195 is also shown in the figure. FIG. 9A is a perspective view of the electrical contacts also shown in FIG. 9, pivoted horizontally. Negative battery contacts 103B and positive contacts 103A are shown in relation to support plate 102 and body coupling 101. These control module components are shown and explained beginning with FIG. 10.

Figure 10:
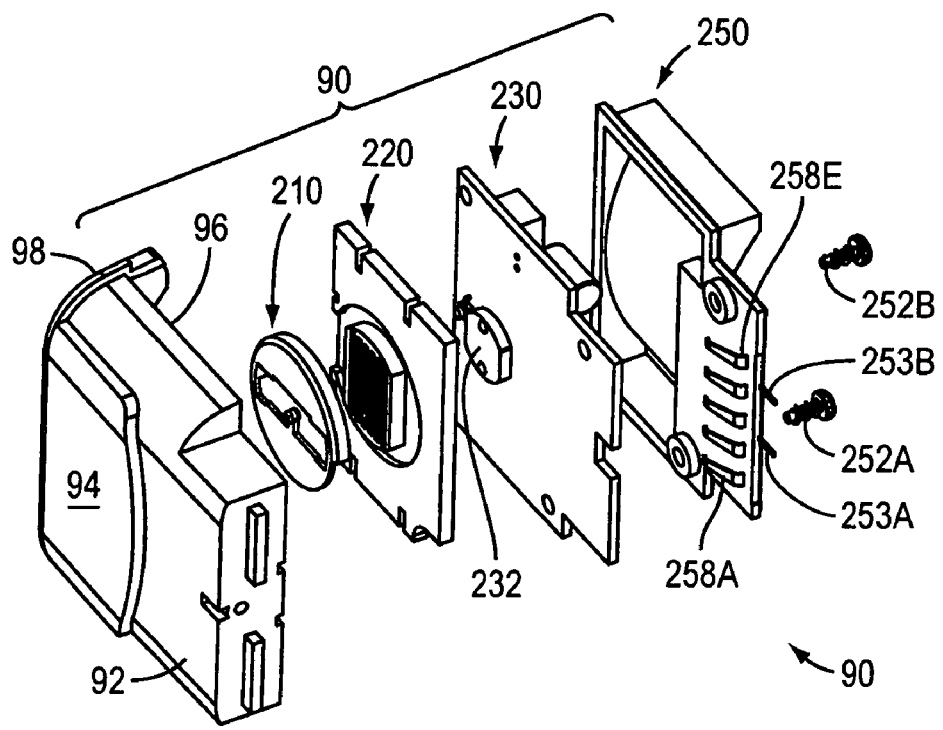
FIGS. 10 and 10A are perspective, exploded views of a control module used in the conversion assembly of FIGS. 2, 2A and 2B.

Power module 80, including four 1.5 V batteries 84A-D, is in front of driver module body inside a covering 196, which holds the motor and gear assembly (see FIG. 8). A contact 103B connects with the cathode of battery 84B, so that when the circuit is closed, current flows towards a contact 108B, which engages with a contact pad 256B. A circuit contact 108A engages with a contact pad 256E, and a contact 103A engages with anode of battery 84D. Contact unit 100 includes a manual override contact 106, which engages with a contact pad 256A when pushed by manual contact prong 76. Manual contact prong 76 pushes contact pad 256A when driver module body 72 is manually pushed by the user to set off the flusher. The purpose of manual override contact 106 is to signal to the microcontroller 302 (FIG. 11) when the flusher has been manually set off by the user pushing driver module body 72. After receiving the manual signal, the microcontroller will not provide the automatic flush command when the control module 90 detects the same user moving away from the unit. This manual override contact and contact pad are also seen in FIG. 10. Contact unit 100 is held in place by support plate 102, which has a body coupling 101 found in conversion assembly body cavity 64.

Figure 10A:
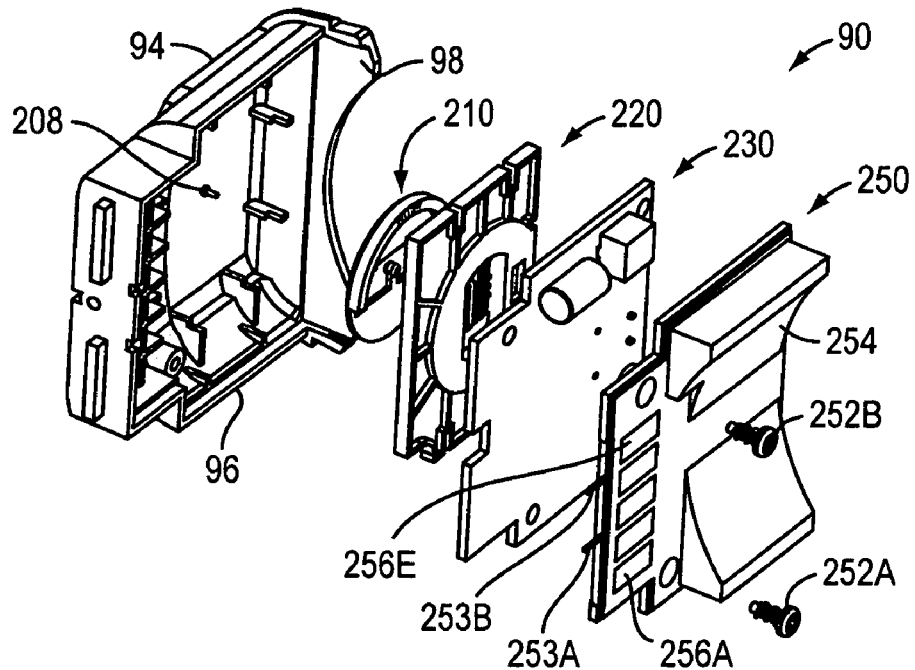

FIGS. 10 and 10A are perspective, exploded views from the front and the back of control module 90. Control and optical module 90 includes an enclosure cover 92 with an optical window 94 aligned with respect to a gravity shutter 210 and a beam guide element (collimation plate) 220. A circuit board 230 includes a passive sensor for detecting a user. Alternatively, control module 90 may include a PC board 220A using an active sensor (see FIGS. 10D and 10E). PC board 230 comprises all electronic elements, including a microcontroller 302, as explained in connection with FIGS. 11-11D. Gravity shutter 210, beam guide 220 and PC board 230 are located between front housing cover 92 and inner housing wall 250. Inner housing wall 250 includes 5 electrical contacts 258A, 258B, 258C, 258D and 258E, (which are connected to contact pads 256A-E on the opposite side of wall 250; see FIGS. 9 and 10A) providing contact to PC board 230. Wall 250 also includes motor connection pins 253A and 253B, which make contact with motor 200 to power it. Pins 253A and B can also be seen in FIG. 9.

Figure 10B:
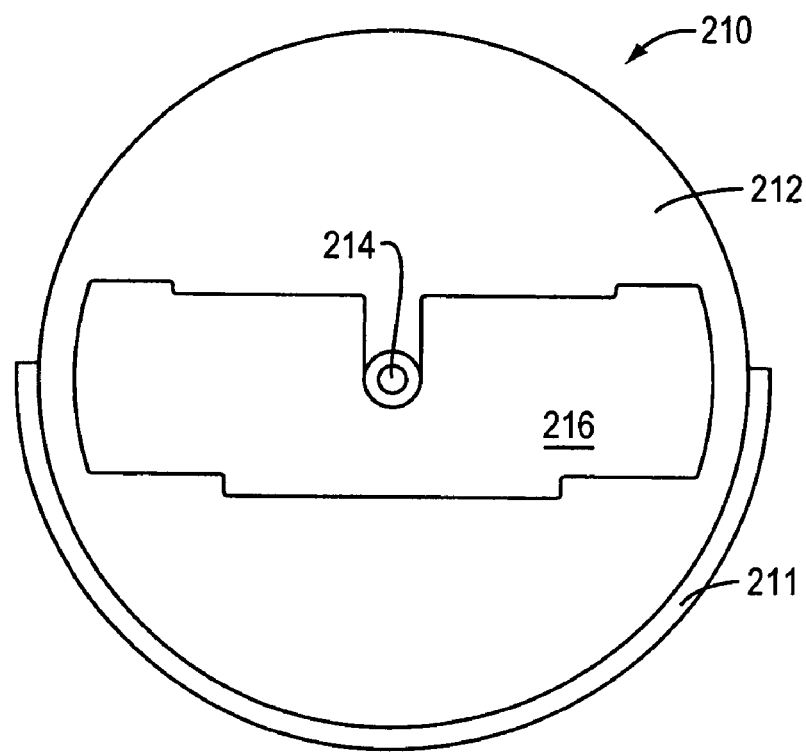
FIG. 10B is a front view of a shutter used with an optical sensor located inside the control module shown in FIGS. 10 and 10A.
Figure 10C:
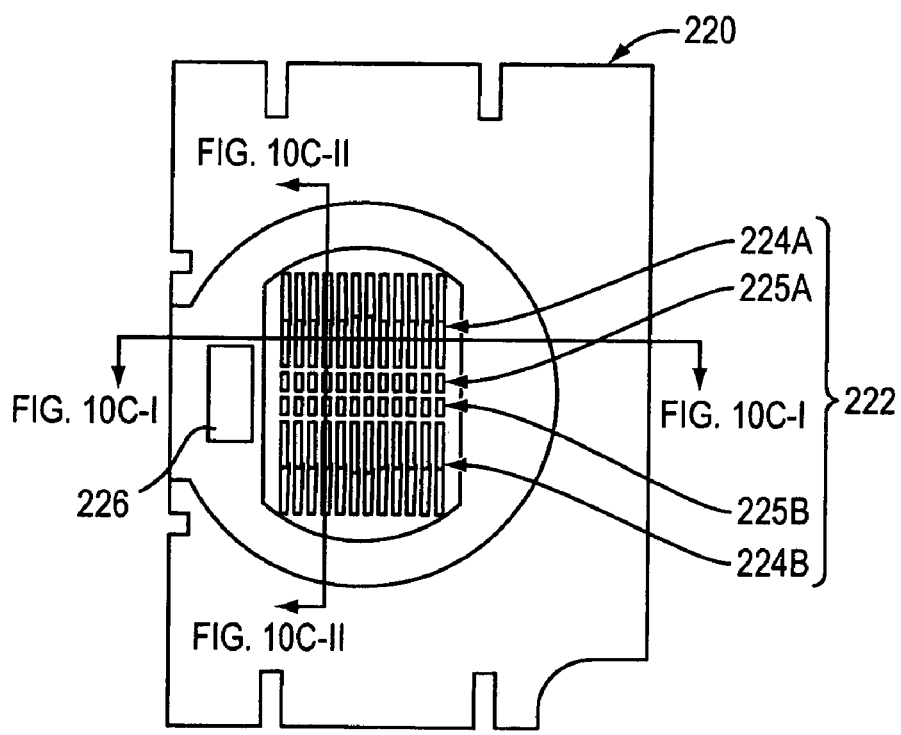
FIG. 10C is a front view of a collimation plate used with the optical sensor located inside the control module shown in FIGS. 10 and 10A.

As shown in FIGS. 10B and 10C, gravity shutter 210 is made of an opaque plastic 212, and includes a weight rim 211 and a swivel opening 214. Gravity shutter 210 swivels about a pin 208, on the front of control module cover 92, shown in FIG. 10A. External light passes through opening 216 and arrives at beam guide 220 (collimation plate). Beam guide 220 includes 4 sets of slots 222 designed to shape the optical field in front of the flusher to achieve a desired U-shape, as described in PCT application PCT/US2003/038730, filed on Dec. 4, 2003, (published as WO 2004/051011) which is incorporated by reference. Slots 222 include two sets of long slots 224A and 224B and two sets of short slots 225A and 225B. Beam guide 220 also includes an LED opening 226 arranged to accommodate an LED, forming a user interface. (Light pulses emitted from the LED are used to provide various signals to the user or technician installing conversion assembly 60.)

FIGS. 10C-I and 10C-II are cross-sectional views of slots 222, located in collimation plate 220. Together with opening 216 of gravity shutter 210, slots 222 define the field of view for the passive sensor. Central slots 225A and 225B are angled at 6° to the side. In peripheral slots 224A and 224B angle A is 16°. Photoresistor 232 is located just behind slots 222. (See FIG. 10.)

Figure 10E:
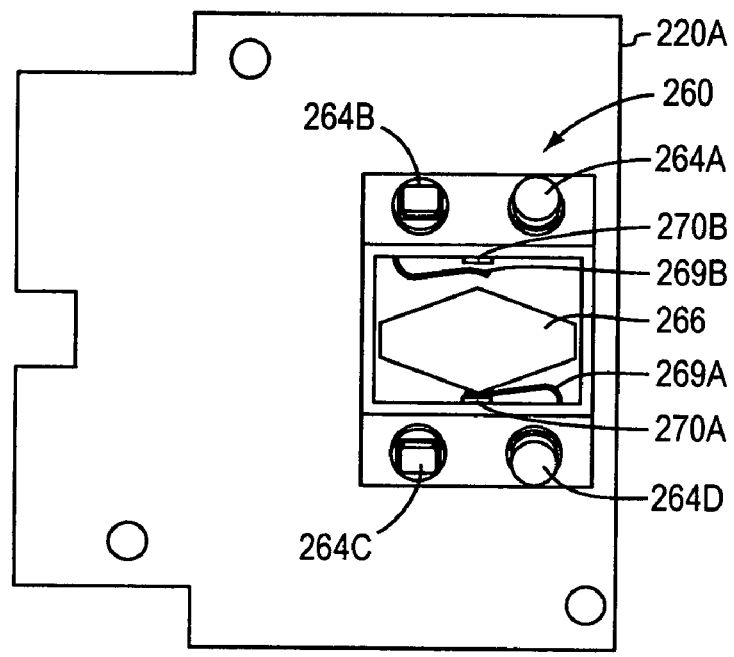
Figure 10D:
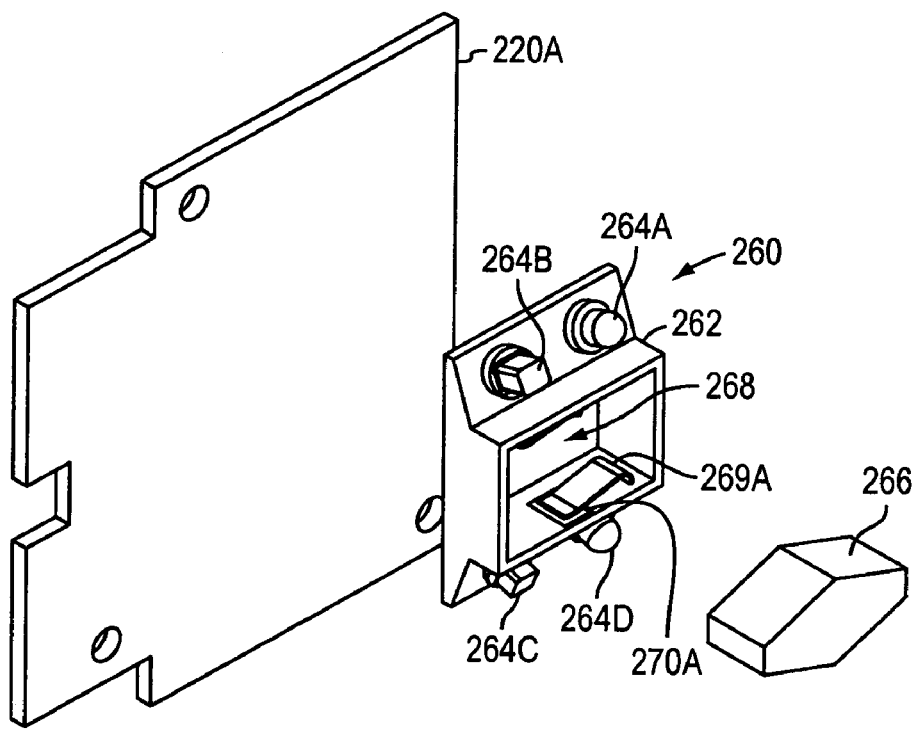

Referring to FIGS. 10D and 10E, active sensor 260, mounted on PC board 220A, is constructed and arranged to operate with gravity shutter 210 and beam guide 220 in a similar way as the passive sensor. Active sensor 260 includes two light-emitting diodes 264A and 264D and two diode detectors 264B and 264C. Active sensor 260 also includes a gravity activator 266, located inside guidance slot 268 and moving, based on the orientation of the conversion assembly 60, between a first contact 269A and a second contact 269B. In the position shown in FIG. 10E, gravity activator 266 presses on first contact 269A, which, due to gravity, is pushed down onto first contact pad 270A. Electrical coupling between contact 269A and pad 270A activates light-emitting diode 264D and diode detector 264C. Alternatively, in the reverse position, gravity activator 266 pushes on contact 269B, which provides electrical connection to contact pad 270B, which in turn activates light-emitting diode 264A and light-emitting diode 264B. Similarly, as with the passive sensor, this active sensor arrangement enables right-hand side or left-hand installation on a manual flusher while automatically adjusting the optical detection field.

Figure 11:
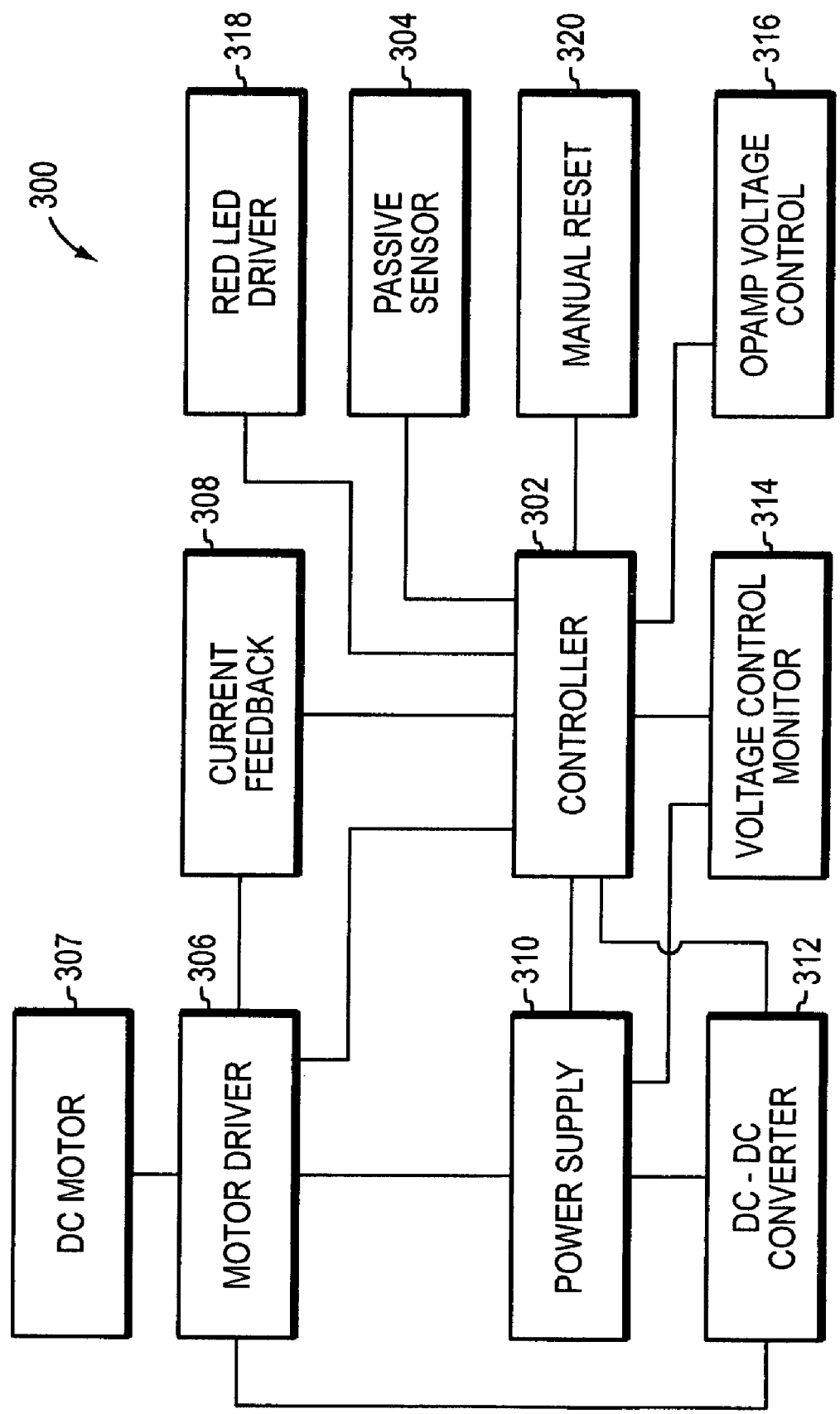
FIG. 11 is a block diagram of a control circuit for controlling the conversion assembly shown in FIG. 2.

FIG. 11 is a block diagram of the control circuit 300 for controlling the conversion assembly 60. The control circuit includes a microcontroller 302, a passive sensor 304, a motor driver 306, a DC motor 307 (i.e., motor 200 in FIG. 8), a current feedback loop 308, a power supply 310, a DC to DC converter 312, a voltage control monitor 314, an OPAMP and active elements voltage controller 316, a red LED driver 318, and a manual reset 320.

Control circuit 300 includes a sensor that may be in general an optical sensor, an ultrasonic sensor, a capacitive sensor, or any other sensor. Alternatively, control circuit 300 may use two or more sensors, which are a combination of one or more of the optical sensor, ultrasonic sensor, or capacitive sensor. Each sensor may be constructed to detect motion in the vicinity of the flush valve, or detect a user's presence in the vicinity of the flush valve. The optical sensor is preferably an active sensor, or passive sensor 304. The active sensor is described in detail also, for example, in U.S. Pat. Nos. 5,979,500; and 5,984,262, and in PCT Application PCT/US2002/38757 (published as WO 03/048463), all of which are incorporated by reference.

The passive sensor is described in detail in PCT application PCT/US2003/038730, filed on Dec. 4, 2003, (published as WO 2004/051011) which is incorporated by reference. Other embodiments of passive sensor 304 are described in PCT application PCT/US2003/041303, filed on Dec. 26, 2003, (published as WO 2004/061343) which is incorporated by reference. Control circuit 300 may be constructed and programmed to execute various flushing algorithms described in PCT application PCT/US2003/041303. Other embodiments of passive sensor 304 are described in PCT application PCT/US2004/040887, filed on Dec. 6, 2004, (published as WO 2005/056938) which is incorporated by reference. Control circuit 300 may use two or more optical sensors; that is, two or more passive sensors or two or more active sensors, or a combination of active and passive sensors, including the sensors described in PCT application PCT/US2004/040887.

Referring again to FIG. 11, microcontroller 302 may be a microcontroller Model No. MC68HC908GR8, made by Freescale (Motorola). DC-DC converter 312 is Model No. 2XSC410, made by Zetek. DC Motor 307 is Model No. RF-500TB-14415, made by Mabuchi. Passive sensor 304 includes a photoresistor Model No. PGM120, or any similar photoresistor.

Referring again to FIG. 11, microcontroller 302 controls the entire operation of the conversion assembly 60. To save power, microcontroller 302 wakes up every 250 msec to obtain a reading from passive sensor 304. After one or several readings, microcontroller 302 compares the obtained data to the calibration data to determine if a user is present in front of the passive sensor. Furthermore, after every 250 msec. wake-up microcontroller 302 sends a signal to voltage controller 316 that turns on power to all peripheral elements of the electronic circuit. After a user's departure is detected in front of passive sensor 304, microcontroller 302 sends a signal to motor driver 306 to provide drive current to DC motor 307 (i.e., motor 200) from power module 80 through pins 253A and B. Motor 307 turns in the first direction to displace flush handle 54 as explained in connection to FIG. 8 while current feedback loop 308 monitors the motor current. When DC motor 307 hits a mechanical stop, there is increased current monitored by current feedback 308. At a threshold current of about 330 mA, microcontroller 302 receives a signal from the feedback 308. The stop signal is provided to the motor driver 306 to terminate the motor current. Thus, current feedback 308 is set up to detect the stop position of motor 307. As described above, the action of motor 307 displaces handle 54, and thus initiates flushing.

Power supply 310 includes four 1.5 V batteries. DC-DC converter 312 is used to guarantee a battery voltage of at least 4.5 V to motor driver 306. Over time, the batteries of power supply 310 deteriorate, and thus provide a lower voltage. Due to the lower voltage, there would be a variation in the speed of DC motor 307. To prevent a possible speed variation, DC-DC converter is used to provide a minimum voltage of 4.5 V after the battery voltage drops below this value.

Voltage control monitor 314 monitors the voltage of the batteries used in power supply 310. If, over time, the voltage is reduced to 4.5 V, voltage control monitor 314 provides a signal to microcontroller 302, which in turn activates DC-DC converter 312. DC-DC converter 312 provides an increased voltage of 4.5 V to motor driver 306, when activated by microcontroller 302.

Still referring to FIG. 11, after detecting the end position of DC motor 307 (i.e., after a full flush) microcontroller 302 provides another signal to motor driver 306 to reverse the current provided to DC motor 307. Thus, DC motor 307 reverses its rotation and retracts activation arm 190 into driver module body 72 (shown in FIGS. 6 and 8). After some time, activation arm 190 is fully retracted into driver module body 72 and this creates a mechanical stop. Due to this mechanical stop, there is again an increased current through motor driver 306, which increased current is detected by current feedback loop 308. Current feedback 308 again provides a signal to microcontroller 302, which provides a stop signal to motor driver 306.

Referring still to FIG. 11, microcontroller 302 wakes up each 250 msec and operates at a frequency of 2 MHz. During sleep time, microcontroller 302 operates at a frequency of 39 kHz. Microcontroller 302 also provides a signal to red LED driver 318. The red LED driver 318 is used to communicate with the user or technician, to indicate various states of conversion assembly 60. For example, the red LED can indicate a low battery state, at which point batteries will need to be replaced. The red LED can also indicate the "arm" time for passive sensor 304, or can indicate the execution of a manual flush or the necessity to manually flush conversion assembly 60 in case of loss of power or other failure.

The red LED can also indicate when the user depresses driver module body 72 to activate handle 54 manually. Manual reset 320 provides a signal to microcontroller 302 triggered by the movement that causes arm 76 to depress contact 106, as shown in FIG. 9.

Figure 11A:
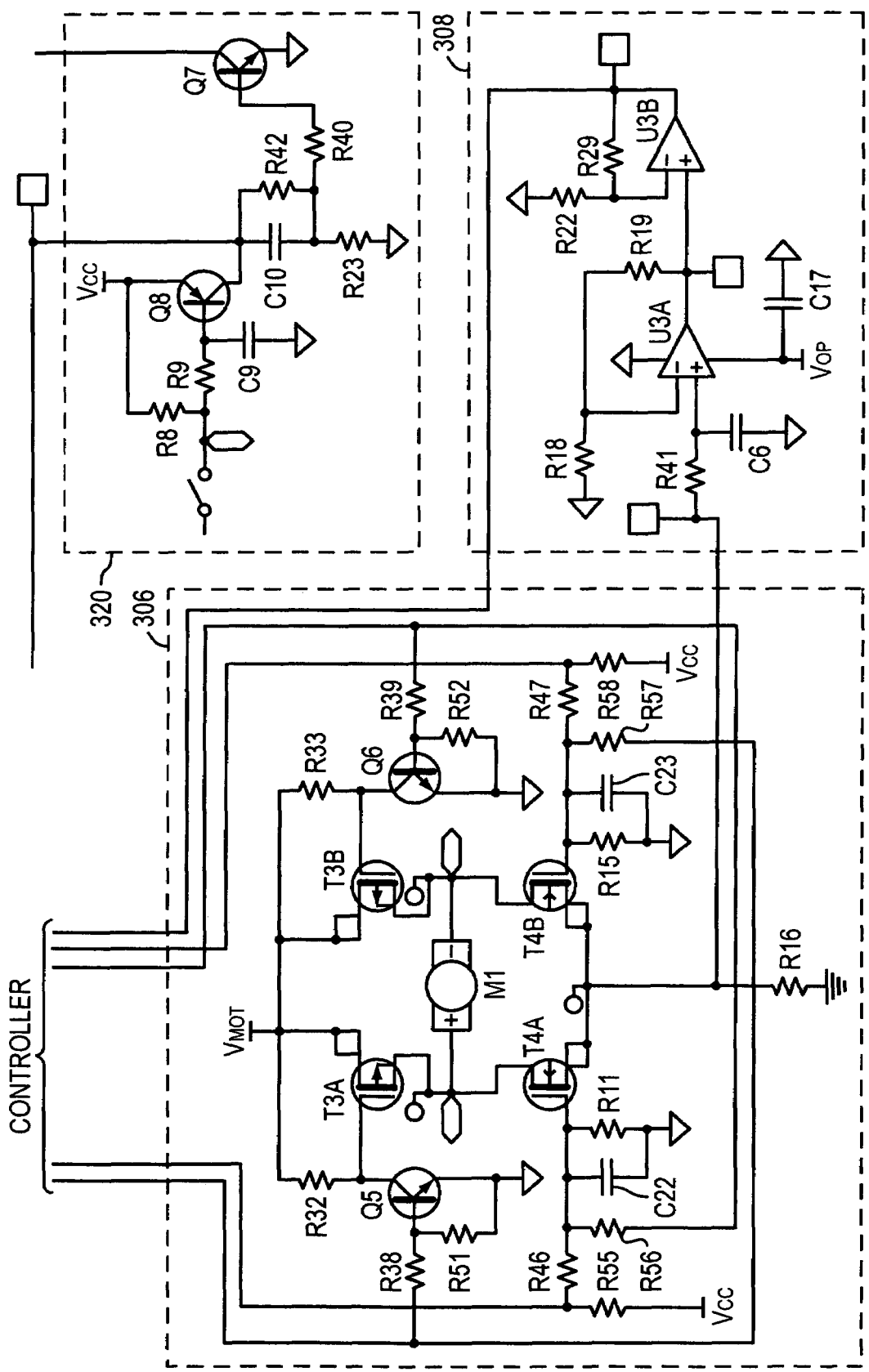
FIG. 11A is a circuit diagram of a motor driver, a manual reset, and a current feedback shown in the block diagram of FIG. 11.
Figure 11B:
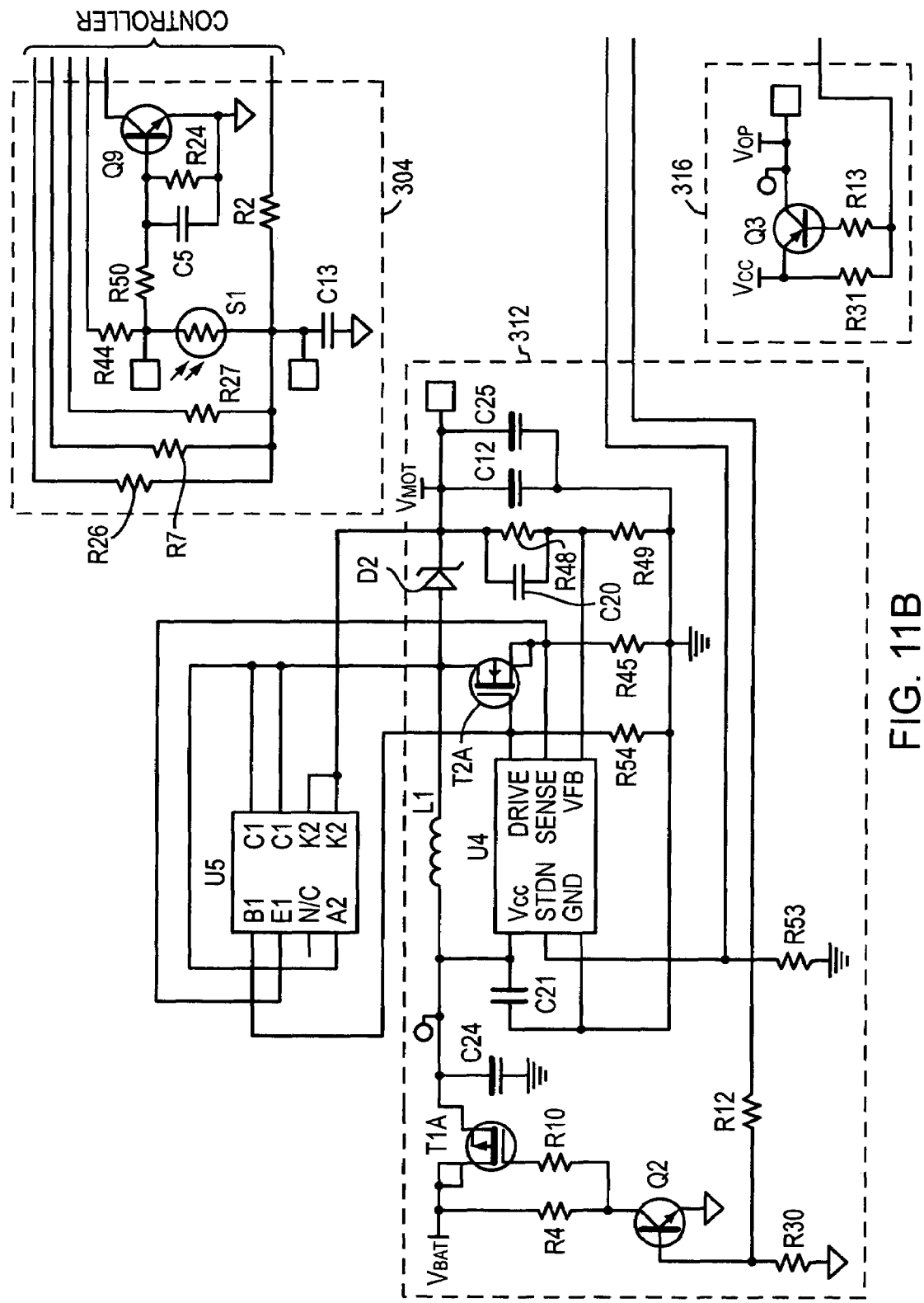
FIG. 11B is a circuit diagram of a DC-DC converter, and OPAMP voltage control shown in the block diagram of FIG. 11.
Figure 11C:
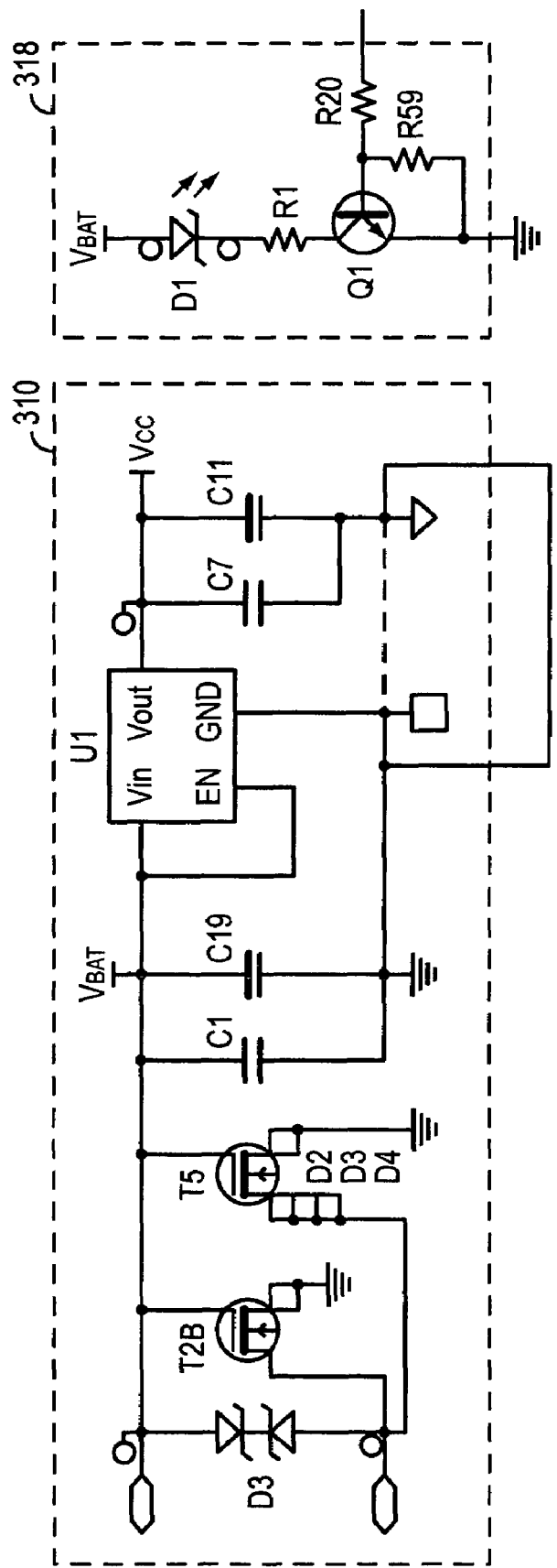
FIG. 11C is a circuit diagram of a power supply and red LED driver shown in the block diagram of FIG. 11.
Figure 11D:
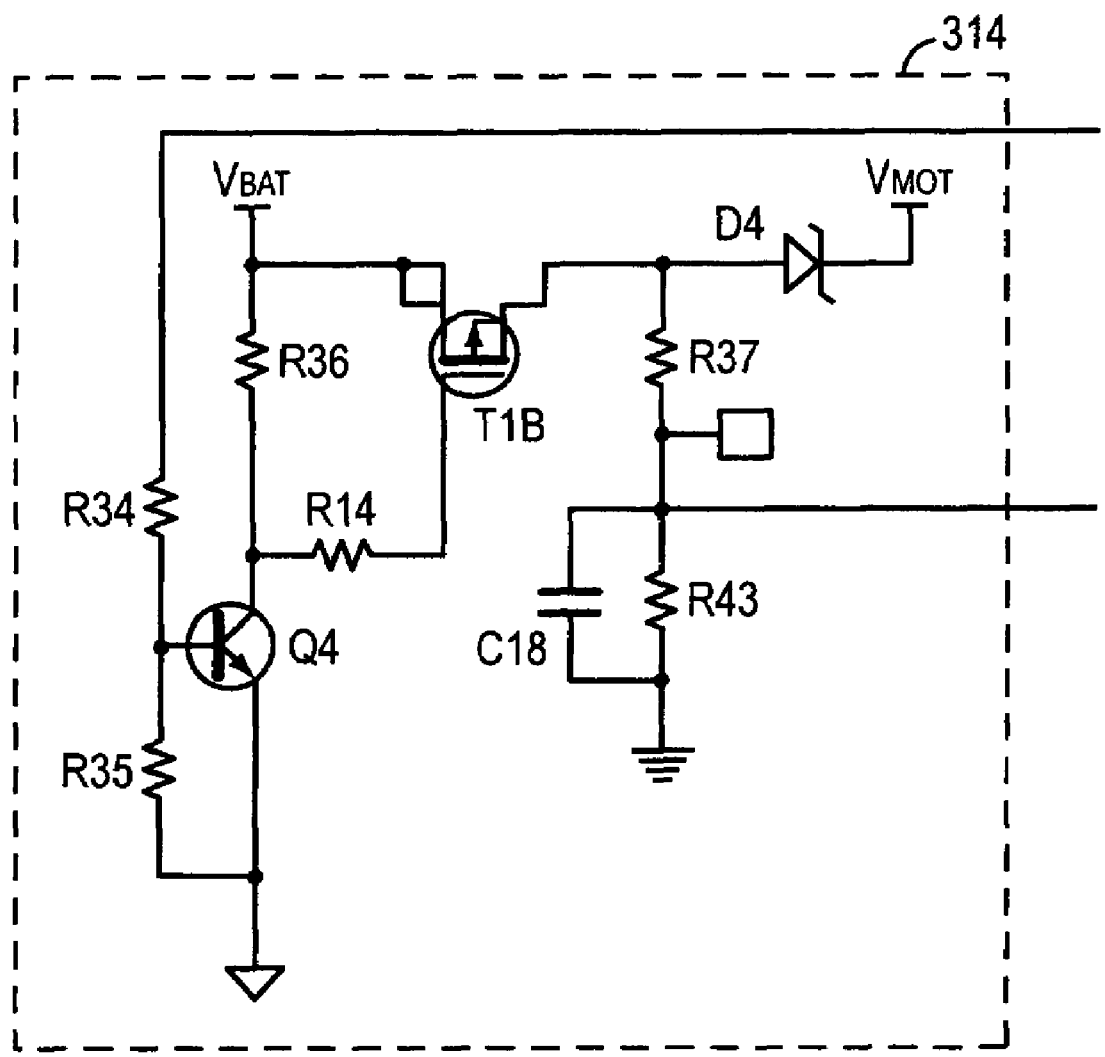
FIG. 11D is a circuit diagram of a voltage control monitor shown in the block diagram of FIG. 11.

FIGS. 11 A-D show circuit diagrams corresponding to the block diagram of FIG. 11, showing detailed circuit diagrams of the components. FIG. 11A is a circuit diagram of a portion of the control circuit shown in FIG. 11, showing the motor driver, manual reset, and current feedback. FIG. 11B is a circuit diagram of a portion of the control circuit shown in FIG. 11, showing the passive sensor, DC-DC converter, and OPAMP voltage control. FIG. 11C is a circuit diagram of a portion of the control circuit shown in FIG. 11, showing the power supply and red LED driver. FIG. 11D is a circuit diagram of a portion of the control circuit shown in FIG. 11, showing the voltage control monitor.

Of particular importance in the invention is the fact that the retrofit assembly may be mounted on the flush valve without removing any flush valve components or disconnecting the water supply. The conversion assembly 60 is fastened onto the coupling nut 55 and cylindrical housing 53, which mounts the flush valve handle 54 to the flush valve 10. The other components are mounted in the manner shown in the drawings presented. The conversion assembly can thus automatically flush valve 10, or manual flushing can be initiated by the user. The preferred form of flushing is for automatic operation to move the handle 54. The override can be used under conditions in which the automatic system is not properly functioning.

Whereas the preferred form of the invention has been shown and described herein, it should be realized that there may be many modifications, substitutions and alterations thereto.

What is claimed is:

1. A conversion assembly for converting an installed manually-operated flush valve used with a urinal or toilet, comprising:
   a power module;
   a driver module arranged for mechanical coupling to a manual handle of said manually-operated flush valve;
   a passive optical sensor including a light detector constructed to detect ambient room light arriving to said detector from a detection field; and
   a control module constructed to receive signal corresponding to the detected ambient light and to activate said driver module based on a background level of said ambient light and present levels of said ambient light measured over several time intervals by said light detector.

2. The conversion assembly of claim 1 which does not include any part being in direct contact with a water passage of said manually-operated flush valve.

3. The conversion assembly of claim 1 wherein said control module is constructed to determine each activation based on calibration data stored in said control module.

4. The conversion assembly of claim 1 wherein said control module is constructed to determine activation of said driver module by executing a detection algorithm employing detection of increase and decrease of said ambient light due to the presence of a user within said detection field.

5. The conversion assembly of claim 4 wherein said control module is constructed to determine each activation based on a background level of said ambient light and present levels of said ambient light measured over several time intervals by said light detector.

6. The conversion assembly of claim 1 wherein said light detector includes a photodiode.

7. The conversion assembly of claim 1 wherein said light detector includes a photoresistor.

8. The conversion assembly of claim 1 wherein said driver module is enclosed in a driver module body that includes a DC motor and a planetary gear assembly driving a cam.

9. The conversion assembly of claim 8 wherein said cam is constructed and arranged to cause displacement of an activation arm that acts on said manual handle.

10. The conversion assembly of claim 1 wherein said manually-operated flush valve mechanism includes a piston-type mechanism.

11. The conversion assembly of claim 1 wherein said manually-operated flush valve mechanism includes a diaphragm-type mechanism.

12. A conversion assembly for converting an installed manually-operated flush valve used with a urinal or toilet, comprising:
    a power module;
    a driver module arranged for mechanical coupling to a manual handle of said manually-operated flush valve;
    a passive optical sensor including a light detector constructed to detect ambient light arriving to said detector from a detection field, wherein said passive optical sensor includes an optical element located in front of said light detector arranged to partially define a detection field and eliminate invalid targets; and
    a control module constructed to activate said driver module based on a signal from said passive optical sensor.

13. The conversion assembly of claim 12 wherein said optical element includes a collimation plate.

14. The conversion assembly of claim 12 wherein said light detector includes a photodiode.

15. The conversion assembly of claim 12 wherein said driver module includes a gear mechanism coupled to said displacement member.

16. The conversion assembly of claim 12 wherein said manually-operated flush valve includes a diaphragm-type valve mechanism.

17. The conversion assembly of claim 12 wherein said manually-operated flush valve includes a piston-type valve mechanism.

18. The conversion assembly of claim 12, wherein said light detector includes a photoresistor.

19. The conversion assembly of claim 12 wherein said driver module includes a DC motor and a planetary gear assembly driving a cam.

20. The conversion assembly of claim 19 wherein said cam is constructed and arranged to cause displacement of an activation arm that acts on said manual handle.

21. The conversion assembly of claim 19 wherein said driver module includes a DC motor arranged to operate in two directions.

22. A conversion assembly for converting an installed manually-operated bathroom flush valve, comprising an externally mounted conversion assembly comprising:
a power module,
a driver module including a DC motor arranged to operate in two directions, said driver module being mechanically coupled to an activation arm arranged to externally activate said manually-operated flush valve using a manual valve handle;
an attachment lock-in module co-operatively constructed with said driver module and designed for slidable attachment of said conversion assembly to said flush valve; and
a control module including a controller and a DC to DC converter coupled to said power module, said controller being constructed to activate said DC motor of said driver module to displace said activation arm.

23. The conversion assembly of claim 22, including an optical sensor that includes a light emitter constructed to emit a light beam for detecting a user based on reflection of said light.

24. The conversion assembly of claim 22, including an optical sensor that includes a passive sensor arranged to detect ambient room light.

25. The conversion assembly of claim 22 wherein said driver module includes a gear mechanism coupled to drive a cam.

26. The conversion assembly of claim 25 wherein said cam is constructed and arranged to cause displacement of said activation arm is constructed and arranged to pivotably displace said manual valve handle.

27. The conversion assembly of claim 22 wherein said controller is constructed to activate a reverse drive current delivered to said DC motor to reverse rotation of said DC motor.

28. The conversion assembly of claim 22 wherein said controller includes a motor driver.

29. The conversion assembly of claim 22 wherein controller includes a motor driver having an H-bridge driver.

30. A conversion assembly for converting an installed manually-operated bathroom flush valve, comprising an externally mounted conversion assembly comprising:
a power module;
a driver module mechanically coupled to an activation arm arranged to externally activate said manually-operated flush valve using a manual valve handle;
an attachment lock-in module co-operatively constructed with said driver module and designed for slidable attachment of said conversion assembly to said flush valve, wherein said attachment lock-in module includes lock-in jaws constructed and arranged to be attached to a coupling nut associated with said manual valve handle; and
a control module constructed to activate said driver module.

31. The conversion assembly of claim 30 wherein said driver module includes a gear mechanism.

32. The conversion assembly of claim 30 wherein said activation arm is constructed and arranged to pivotably displace said manual valve handle.

33. The conversion assembly of claim 30 wherein said manually-operated flush valve includes a diaphragm-type valve mechanism.

34. The conversion assembly of claim 30 wherein said manually-operated flush valve includes a piston-type valve mechanism.

35. The conversion assembly of claim 30 including a passive optical sensor.

36. The conversion assembly of claim 30 including an active optical sensor.

37. A conversion assembly for converting an installed manually-operated flush valve used with a urinal or toilet, comprising:
a power module;
a driver module arranged for mechanical coupling to a manual handle of said manually-operated flush valve, said driver module having an enclosure including inside a planetary gear mechanism mechanically coupled to an activation arm to displace said manual handle of said manually-operated flush valve and including an activation arm in contact with said manual valve handle;
said enclosure of said driver module being pivotably mounted to rotate about an axis perpendicular to elongated direction of said manual valve handle;
said enclosure of said driver module being constructed and arranged to enable a user to displace manually said enclosure and thereby displace said activation arm; and
a control module constructed to activate said driver module to initiate automatic activation of said activation arm.

38. The conversion assembly of claim 37 wherein said driver module includes a DC motor.

39. The conversion assembly of claim 37 wherein said driver module is constructed to pivot with respect to said power module when displaced by said user.

40. The conversion assembly of claim 37 wherein said driver module includes a DC motor arranged to operate in two directions.

41. The conversion assembly of claim 37 wherein said manually-operated flush valve includes a diaphragm-type valve mechanism.

42. The conversion assembly of claim 37 wherein said manually-operated flush valve includes a piston-type valve mechanism.

43. The conversion assembly of claim 37 wherein said activation arm includes an engagement surface cooperatively arranged with the shape of said manual handle.

44. The conversion assembly of claim 37 wherein said driver module includes a cam that includes an engagement surface having an involute surface for displacing an activation arm.

45. A method for converting a manually-operated flush valve used with a urinal or toilet, comprising the acts of:
providing a manually-operated flush valve including a valve mechanism located within a valve body constructed and arranged to control water flow between a water inlet and a water outlet, and a manual handle mechanically coupled to said valve mechanism which is constructed to operate said valve mechanism upon pivotable displacement;
providing a conversion assembly including a power module, a control module, a driver module including a motor, and an activation arm;
mounting fixedly said conversion assembly onto said valve body thereby providing a mechanical coupling between said activation arm and said manual handle;
actuating said control module to deliver current to said motor constructed to displace said activation arm;
pivotably displacing said manual handle by said activation arm to actuate said valve mechanism of said manually-operated flush valve and cause water flow between said water inlet and said water outlet;

monitoring said current flowing through said motor by a current feedback loop; and terminating said current upon reaching a threshold value and thereby stopping said motor.

46. The method of claim 45 wherein said acts of mounting and positioning are performed without breaking a water seal of said flush valve.

47. The method of claim 45 further including, after said act of terminating, delivering a reverse current to said motor and thereby reversing rotation of said motor.

48. A conversion assembly for converting an installed manually-operated flush valve used with a urinal or toilet, comprising:

a driver module including a motor mechanically coupled to a manual handle of said manually-operated flush valve;

a control module including a controller and a current feedback loop electrically connected to said driver module, said controller being constructed to activate drive current delivered to said motor and thereby cause displacement of said manual handle by said driver module and constructed to terminate said drive current to said monitor based on signals from said current feedback loop monitoring current flowing through said motor.

49. The conversion assembly of claim 48 wherein said controller is constructed to activate a reverse drive current delivered to said motor to reverse rotation of said motor while said feedback loop is arranged to provide signals to said controller.

50. The conversion assembly of claim 48 wherein said manually-operated flush valve includes a diaphragm-type valve mechanism.

51. The conversion assembly of claim 48 wherein said manually-operated flush valve includes a piston-type valve mechanism.

52. The conversion assembly of claim 48 wherein said driver module includes a DC motor and a planetary gear assembly coupled to drive a cam.

53. The conversion assembly of claim 52 wherein said cam is constructed and arranged to cause displacement of an activation arm that acts on said manual handle.

54. A control system for use in a conversion assembly for converting an installed manually-operated bathroom flush valve, comprising:

a DC power supply;

a DC to DC converter connected to receive power from said DC power supply;

a controller connected to receive power from said DC power supply, said controller being connected to receive signal from an optical sensor and connected to initiate motor current to a DC motor; and a feedback loop connected to monitor said motor current and provide signal to said controller.

55. The control system of claim 54 wherein said DC motor is constructed to operate in two directions.

56. The control system of claim 54 wherein said optical sensor includes a light emitter and a light detector.

57. The control system of claim 54 wherein said optical sensor includes a light detector constructed and arranged to detect ambient room light.

58. The control system of claim 55, wherein said controller is constructed to activate a reverse drive current delivered to said DC motor to reverse rotation of said DC motor.

59. The control system of claim 54 wherein said controller includes a motor driver.

60. The control system of claim 54 wherein said controller includes a motor driver having an H-bridge driver.

* * * * *